(12) United States Patent  
Nordholt et al.

(10) Patent No.: US 9,819,418 B2
(45) Date of Patent: Nov. 14, 2017

(54) QUANTUM COMMUNICATIONS SYSTEM WITH INTEGRATED PHOTONIC DEVICES

(71) Applicant: Los Alamos National Security, LLC, Los Alamos, NM (US)

(72) Inventors: Jane E. Nordholt, Los Alamos, NM (US); Charles Glen Peterson, Los Alamos, NM (US); Raymond Thorson Newell, Santa Fe, NM (US); Richard John Hughes, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 330 days.

(21) Appl. No.: 14/422,106

(22) PCT Filed: Aug. 16, 2013

(86) PCT No.: PCT/US2013/055430
§ 371 (c)(1),
(2) Date: Feb. 17, 2015

(87) PCT Pub. No.: WO2014/042822
PCT Pub. Date: Mar. 20, 2014

(65) Prior Publication Data
US 2015/0236791 A1    Aug. 20, 2015

Related U.S. Application Data

(60) Provisional application No. 61/684,502, filed on Aug. 17, 2012.

(51) Int. Cl.
H04B 10/04      (2006.01)
H04B 10/532     (2013.01)
(Continued)

(52) U.S. Cl.
CPC ......... *H04B 10/532* (2013.01); *H04B 10/501* (2013.01); *H04B 10/5161* (2013.01); *H04B 10/54* (2013.01); *H04B 10/541* (2013.01)

(58) Field of Classification Search
CPC .... H04B 10/532; H04B 10/501; H04B 10/54; H04B 10/541; H04B 10/524; H04B 10/5161; H04B 10/508
(Continued)

(56) References Cited

U.S. PATENT DOCUMENTS 5,966,224 A    10/1999  Hughes et al.
6,263,435 B1    7/2001  Dondeti et al.
(Continued)

FOREIGN PATENT DOCUMENTS

CN    101572600 A    11/2009
CN    101599826 A    12/2009
(Continued)

OTHER PUBLICATIONS

AFP-JIJI Press, "Japanese Develop System to Prevent Mobile Phone Tapping," *JIJIPress*, 4 pages, downloaded from the World Wide Web (document marked Sep. 2, 2010).
(Continued)

*Primary Examiner* — M. R. Sedighian
(74) *Attorney, Agent, or Firm* — Wilmer Cutler Pickering Hale and Dorr LLP

(57) ABSTRACT

Security is increased in quantum communication (QC) systems lacking a true single-photon laser source by encoding a transmitted optical signal with two or more decoy-states. A variable attenuator or amplitude modulator randomly imposes average photon values onto the optical signal based on data input and the predetermined decoy-states. By measuring and comparing photon distributions for a received QC signal, a single-photon transmittance is estimated. Fiber (Continued)

birefringence is compensated by applying polarization modulation. A transmitter can be configured to transmit in conjugate polarization bases whose states of polarization (SOPs) can be represented as equidistant points on a great circle on the Poincaré sphere so that the received SOPs are mapped to equidistant points on a great circle and routed to corresponding detectors. Transmitters are implemented in quantum communication cards and can be assembled from micro-optical components, or transmitter components can be fabricated as part of a monolithic or hybrid chip-scale circuit.

17 Claims, 14 Drawing Sheets

(51) Int. Cl.
   *H04B 10/50* (2013.01)
   *H04B 10/516* (2013.01)
   *H04B 10/54* (2013.01)
(58) Field of Classification Search
   USPC .................................. 398/184, 183, 185, 152
   See application file for complete search history.

(56) References Cited

U.S. PATENT DOCUMENTS

| | | | |
|---|---|---|---|
| 6,289,104 B1 | 9/2001 | Patterson et al. | |
| 6,445,453 B1 | 9/2002 | Hill | |
| 6,748,081 B1 | 6/2004 | Dultz et al. | |
| 6,748,083 B2 | 6/2004 | Hughes et al. | |
| 7,515,716 B1 | 4/2009 | Elliott | |
| 7,574,137 B1 | 8/2009 | Lekki et al. | |
| 7,587,654 B2 | 9/2009 | Matsumoto | |
| 7,627,126 B1 | 12/2009 | Pikalo et al. | |
| 7,725,026 B2 | 5/2010 | Patel et al. | |
| 7,907,850 B2* | 3/2011 | Tanaka ................ | H04B 10/505 380/255 |
| 8,005,227 B1 | 8/2011 | Linnell et al. | |
| 8,213,620 B1 | 7/2012 | Sussland et al. | |
| 2001/0055389 A1 | 12/2001 | Hughes et al. | |
| 2002/0010857 A1 | 1/2002 | Karthik | |
| 2003/0002768 A1 | 1/2003 | Wood et al. | |
| 2003/0098355 A1 | 5/2003 | Johnson | |
| 2004/0017916 A1 | 1/2004 | Staddon et al. | |
| 2004/0114152 A1 | 6/2004 | Hill et al. | |
| 2004/0128509 A1 | 7/2004 | Gehrmann | |
| 2005/0036624 A1 | 2/2005 | Kent et al. | |
| 2005/0044356 A1 | 2/2005 | Srivastava et al. | |
| 2005/0135620 A1 | 6/2005 | Kastella et al. | |
| 2005/0141716 A1 | 6/2005 | Kumar et al. | |
| 2005/0238356 A1 | 10/2005 | Gilbert et al. | |
| 2006/0007531 A1 | 1/2006 | Korengut et al. | |
| 2006/0056630 A1 | 3/2006 | Zimmer et al. | |
| 2006/0088157 A1 | 4/2006 | Fujii | |
| 2006/0168446 A1 | 7/2006 | Ahonen et al. | |
| 2006/0212936 A1 | 9/2006 | Berzanskis et al. | |
| 2006/0222180 A1* | 10/2006 | Elliott ................ | H04L 9/0852 380/263 |
| 2006/0263096 A1 | 11/2006 | Dinu et al. | |
| 2006/0290941 A1 | 12/2006 | Kesler et al. | |
| 2007/0058810 A1 | 3/2007 | Tanaka et al. | |
| 2007/0071244 A1* | 3/2007 | LaGasse ............... | H04L 9/0858 380/278 |
| 2007/0177735 A1 | 8/2007 | Mimih et al. | |
| 2007/0192598 A1 | 8/2007 | Troxel et al. | |
| 2007/0211786 A1 | 9/2007 | Shattil | |
| 2007/0223698 A1 | 9/2007 | Tsurumaru | |
| 2007/0280689 A1 | 12/2007 | Boffi et al. | |
| 2008/0031456 A1 | 2/2008 | Harrison et al. | |
| 2008/0144823 A1 | 6/2008 | Abe et al. | |
| 2008/0152147 A1 | 6/2008 | Xia et al. | |
| 2008/0310856 A1 | 12/2008 | Poppe | |
| 2009/0022322 A1 | 1/2009 | Trifonov | |
| 2009/0092252 A1 | 4/2009 | Noll et al. | |
| 2009/0110033 A1 | 4/2009 | Shattil | |
| 2009/0150561 A1 | 6/2009 | Vig | |
| 2009/0160670 A1 | 6/2009 | Sipple | |
| 2009/0169015 A1 | 7/2009 | Watanabe | |
| 2009/0175450 A1 | 7/2009 | Brandt | |
| 2009/0175452 A1 | 7/2009 | Gelfond et al. | |
| 2009/0180615 A1 | 7/2009 | Trifonov | |
| 2009/0180616 A1 | 7/2009 | Brodsky et al. | |
| 2009/0180776 A1 | 7/2009 | Brodsky et al. | |
| 2009/0185689 A1 | 7/2009 | Beal | |
| 2009/0190759 A1 | 7/2009 | Peev et al. | |
| 2009/0202074 A1 | 8/2009 | Trifonov et al. | |
| 2009/0240913 A1 | 9/2009 | Obana et al. | |
| 2009/0257755 A1 | 10/2009 | Buelow | |
| 2009/0262942 A1 | 10/2009 | Maeda et al. | |
| 2010/0028024 A1 | 2/2010 | Shpantzer et al. | |
| 2010/0080571 A1* | 4/2010 | Akiyama ............. | G02F 1/0123 398/184 |
| 2010/0158252 A1 | 6/2010 | Youn et al. | |
| 2010/0211787 A1 | 8/2010 | Bukshpun et al. | |
| 2010/0226659 A1 | 9/2010 | Nishioka et al. | |
| 2010/0257434 A1 | 10/2010 | Harrison et al. | |
| 2011/0140000 A1 | 6/2011 | Iketaki | |
| 2011/0208971 A1 | 8/2011 | Bhattacharya et al. | |
| 2011/0213979 A1 | 9/2011 | Wiseman et al. | |
| 2011/0280405 A1 | 11/2011 | Habif | |
| 2012/0087500 A1 | 4/2012 | Ukita et al. | |
| 2012/0177201 A1 | 7/2012 | Ayling et al. | |

FOREIGN PATENT DOCUMENTS

| | | |
|---|---|---|
| EP | 2081317 A2 | 7/2009 |
| KR | 10-0892763 B1 | 4/2009 |
| WO | WO-2007/123869 A2 | 11/2007 |
| WO | WO-2008/015758 A1 | 2/2008 |
| WO | WO-2009/093034 A2 | 7/2009 |
| WO | WO-2009/093036 A2 | 7/2009 |
| WO | WO-2009/093037 A1 | 7/2009 |
| WO | WO-2009/141586 A1 | 11/2009 |
| WO | WO-2009/141587 A1 | 11/2009 |
| WO | WO-2009/145392 A1 | 12/2009 |
| WO | WO-2012039595 A1 | 3/2012 |
| WO | WO-2012/044852 A1 | 4/2012 |
| WO | WO-2012044855 A2 | 4/2012 |
| WO | WO-2013/048671 A1 | 4/2013 |
| WO | WO-2013/048672 A1 | 4/2013 |
| WO | WO-2013/048674 A1 | 4/2013 |

OTHER PUBLICATIONS

Alleaume et al., "SECOQC White Paper on Quantum Key Distribution and Cryptography," *SECOQC*, 28 pages (Jan. 2007).

Arda, "A Quantum Information Science and Technology Roadmap—Part 2: Quantum Cryptography—Report of the Quantum Cryptography Technology Experts Panel," 100 pages (Jul. 19, 2004).

Barrie, "Defeating Cyber-Attacks with Quantum Cryptography," FoxNews.com, 2 pages (Mar. 2013) http://www.foxnews.com/tech/2013/03/04/defeating-cyber-attacks-with-quantum-cryptography/.

Becker, "Merkle Signature Schemes, Merkle Trees and Their Cryptanalysis," 28 pages (2008) Seminararbeit Ruhr-Universität Bochum.

Biham et al., "Quantum Cryptographic Network Based on Quantum Memories," *Physical Review A*, vol. 54, No. 4, 8 pages (1996).

Buttler et al., "Free-space Quantum Key Distribution," *Phys. Rev. A*, vol. 57, Issue 4, pp. 2379-2382 (Apr. 1998).

Buttler et al., "Practical Free-space Quantum Key Distribution over 1 km," *Physical Review Letters*, vol. 81, No. 15, pp. 3283-3286 (Oct. 1998).

Chapuran et al., "Optical Networking for Quantum Key Distribution and Quantum Communications," *New Journal of Physics*, vol. 11, 19 pages (Oct. 2009).

Damgård et al., "Secure Identification and QKD in the Bounded-Quantum-Storage Model," *Proc. 27th Annual Int'l. Cryptology Conf. on Advances in Cryptology*, pp. 342-359 (Aug. 2007).

(56) References Cited

OTHER PUBLICATIONS

Duligall et al., "Low Cost and Compact Quantum Key Distribution," *New Journal of Physics*, vol. 8, 16 pages (Oct. 2006).
Federal Information Processing Standards Publication 197, "Announcing the Advanced Encryption Standard (AES)," 51 pages (Nov. 2001).
Federal Information Processing Standards Publication 198, "The Keyed-Hash Message Authentication Code (HMAC)," 20 pages (Mar. 2002).
Graham-Rowe, "My Name Is Bob and I Make E-shopping a Cinch," *New Scientist*, pp. 30-31 (Nov. 2007).
Greenemeier, "Quantum Cryptography Comes to Smart Phones," *Scientific American*, 1 page (Feb. 2012).
Harrington et al., "Enhancing Practical Security of Quantum Key Distribution with a few Decoy States," arXiv:quant-ph/0503002 Los Alamos National Laboratory, 4 pages (Mar. 2005).
Hillery et al., "Quantum Secret Sharing," *Physical Review A*, vol. 59, No. 3, pp. 1829-1834 (Mar. 1999).
Huang et al., "Quantum Key Distribution Based on Multi-Qubit Hadamard Matrices," *2008 The Fourth International Conference on Information Assurance and Security*, pp. 333-337 (2008).
Hughes et al., "Comment on 'Quantum Key Distribution with 1.25 Gbps Clock Synchronization' by J.C. Bienfang et al., quant-ph/0405097," LA-UR-04-4297, 4 pages (Jul. 2004).
Hughes et al., "Free-space Quantum Key Distribution in Daylight," *Journal of Modern Optics*, vol. 47, Issues 2-3, pp. 549-562 (Feb. 2000).
Hughes et al., "Network-Centric Quantum Communications with Application to Critical Infrastructure Protection," LA-UR-13-22718 (version 2), 7 pages (May 2013).
Hughes et al., "Practical Free-Space Quantum Cryptography," QCQC'98, LNCS 1509, pp. 200-213 (1999).
Hughes et al., "Practical Free-space Quantum Key Distribution over 10 km in Daylight and at Night," *New Journal of Physics*, vol. 4, pp. 43.1-43.14 (Jul. 2002).
Hughes et al., "Practical Quantum Cryptography for Secure Free-space Communications," LA-UR-99-737, 12 pages (May 1999).
Hughes et al., "Practical Quantum Key Distribution over a 48-km Optical Fiber Network," LA-UR-99-1593, 13 pages (1999).
Hughes et al., "Quantum Cryptography over Underground Optical Fibers," *Advances in Cryptology*, 16 pages (Jul. 1996).
Hughes et al., "Quantum Key Distribution," Los Alamos National Laboratory Physics Division, pp. 193-196 (Apr. 2004).
Hughes et al., "Secure Communications Using Quantum Cryptography," *Proc. SPIE* Photonic Quantum Computing, vol. 3076, pp. 2-11 (Jul. 1997).
ID Quantique SA, "CLAVIS2 Quantum Key Distribution for R&D Applications," 2 pages (downloaded from the World Wide Web on Sep. 9, 2011) http://www.idquantique.com/scientific-instrumentation/clavis2-qkd-platform.html.
ID Quantique SA, "Redefining Precision CLAVIS2: The Most Versatile Quantum Key Distribution Research Platform," 4 pages (document marked Jan. 2010).
ID Quantique SA, "Redefining Security CERBERIS the Best of Classical and Quantum Worlds: Layer 2 Link Encryption with Quantum Key Distribution," 2 pages (document marked Jan. 2010).
ID Quantique SA, "Separation of Duties: Dedicated vs Integrated Encryption Appliances," White Paper, Version 1.0, 8 pages (Feb. 2011).
International Search Report and Written Opinion for International Patent Application No. PCT/US2013/055356, dated May 5, 2014 (7 pages).
International Search Report for International Patent Application No. PCT/US2012/053378 (2 pages) dated Dec. 7, 2012.
Kunz-Jacques et al., "Using Hash-Based Signatures to Bootstrap Quantum Key Distribution," arXiv preprint arXiv:1109.2844, 9 pages (Sep. 2011).
Los Alamos National Laboratory, "Quantum Smart Card—QKarD,"", Mar. 2010, 1 page.
Ma et al., "High Speed Quantum Key Distribution Over Optical Fiber Network System," Journal of Research of NIST, vol. 114, No. 3, 29 pages (May-Jun. 2009).
MagiQ Technologies, Inc., "MAGIQ QPN™ 8505 Security Gateway Uncompromising VPN Security™," 4 pages (document marked 2007).
Menendez et al., "Network Applications of Cascaded Passive Code Translation for WDM-compatible Spectrally Phase-encoded Optical CDMA," Journal of Lightwave Technology, vol. 23, No. 10, 13 pages (2005).
Menezes et al., "Handbook of Applied Cryptography," Table of Contents and Chapters 11-13, 177 pages (1997).
Mink, "Custom Hardware to Eliminate Bottlenecks in QKD Throughput Performance," *Proc. SPIE*, vol. 6780, 6 pages (Sep. 2007).
MIT Technology Review, "Government Lab Reveals It Has Operated Quantum Internet for Over Two Years," 10 pages (May 6, 2013).
Mitsubishi Electric Corporation Press Release, "Mitsubishi, NEC, Tokyo University Realize Successful Interconnection of Quantum Encryption Networks for First Time in Japan," 4 pages (document marked May 12, 2006).
Mitsubishi Electric Corporation, "Mitsubishi Electric Advance: Cryptography Edition," vol. 100, 29 pages (Dec. 2002).
Mitsubishi Electric Corporation, "Mitsubishi Electric Advance: Information Security Technology," vol. 126, 27 pages (Jun. 2009).
Mitsubishi Electric, "One-time Pad Mobile Phone Software," 1 page (Oct. 2010).
National Institute of Information and Communications Technology Press Release, "Inauguration of the Tokyo QKD Network," 3 pages (document marked Oct. 14, 2010).
Nordholt et al., "A New Face for Cryptography," Los Alamos Science, No. 27, pp. 68-85 (2002).
Nordholt et al., "Present and Future Free-space Quantum Key Distribution," *Proc. SPIE Free-Space Laser Communication Technologies XIV*, vol. 4635, pp. 116-126 (Apr. 2002).
Peev et al., "The SECOQC Quantum Key Distribution Network in Vienna," *New Journal of Physics*, vol. 11, 37 pages (Jul. 2009).
Peters et al., "Dense Wavelength Multiplexing of 1550 nm QKD with Strong Classical Channels in Reconfigurable Networking Environments," *New Journal of Physics*, vol. 11, 17 pages (Apr. 2009).
Quintessence Labs Pty Ltd., "Breakthrough Technology," "Optical Subsystem Module/Card," "Modules of Operation," and "Application Areas," 5 pages (documents downloaded from the World Wide Web on Sep. 9, 2011) http://www.quintessencelabs.com/print-template.php.
Rass et al., "Quantum Coin-Flipping-Based Authentication," *IEEE*, 5 pages (Jun. 2009).
Rosenberg et al., "Long-Distance Decoy-State Quantum Key Distribution in Optical Fiber," *Physical Review Letters*, vol. 98, 4 pages (Jan. 2007).
Rosenberg et al., "Practical Long-distance Quantum Key Distribution System Using Decoy Levels," *New Journal of Physics*, vol. 11, 10 pages (Apr. 2009).
Rosenberg et al., "Quantum Key Distribution at Telecom Wavelengths with Noisefree Detectors," 8 pp. (also published as Rosenberg et al., "Quantum Key Distribution at Telecom Wavelengths with Noise-free Detectors," *IEEE Applied Physics Letters*, vol. 88, Issue 2, pp. 21108-1-21108-3 (Jan. 2006)).
Runser et al., "Progress Toward Quantum Communications Networks: Opportunities and Challenges," *Optoelectronic Integrated Circuits IX*, vol. 6476, 15 pages (Mar. 2007).
Schneider, "A Critical Look at Wireless Power," *IEEE Spectrum*, 10 pages (May 2010).
Shih et al., "New Efficient Three-Party Quantum Key Distribution Protocols," *IEEE Journal of Selected Topics in Quantum Electronics*, 15:6 pp. 1602-1606 (Nov./Dec. 2009).
Toliver et al., "Demonstration of 1550 nm QKD with ROADM-based DWDM Networking and the Impact of Fiber FWM" *Conj. on Lasers and Electro-Optics*, 2 pages (May 2007).

(56) References Cited

OTHER PUBLICATIONS

Toliver et al., "Experimental Investigation of Quantum Key Distribution Through Transparent Optical Switch Elements," *IEEE Photonics Technology Letters*, vol. 15, Issue 11, pp. 1669-1671 (Nov. 2003).
Troiani, "Los Alamos Lab Uses Quantum Physics for Mobile Security," 2 pages, downloaded from <http://www.thenewnewinternet.com/2012/01/26/los-alamos-labuses-quantum-physics-for-mobile-security/> (Jan. 26, 2012).
Vittorio, "Quantum Cryptography: Privacy Through Uncertainty," ProQuest, 9 pages (Oct. 2002).
Wegman et al., "New Hash Functions and Their Use in Authentication and Set Equality" *Journal of Computer and System Sciences*, vol. 22, Issue 3, pp. 265-279 (Jun. 1981).
Wikipedia, "Key Distribution," 5 pages (2010).
Wikipedia, "One-time Pad," 12 pages (2010).
Wikipedia, "Quantum Cryptography," 10 pages (2010).
Written Opinion for International Patent Application No. PCT/US2012/053378, dated Dec. 7, 2012 (6 pages).
International Search Report for PCT/US2013/055430 dated Jun. 5, 2014 (4 pages).
Written Opinion for PCT/US2013/055430 dated Jun. 5, 2014 (6 pages).
Extended European Search Report for European Patent Application No. 13837039.0 dated Mar. 30, 2016 (11 pages).
Wong, F.N.C. et al., "Efficient Generation of Polarization-Entangled Photons in Nonlinear Crystal," ISSN 1054-660X, Laser Physics, vol. 16, No. 11, pp. 1517-1524 (2006).

\* cited by examiner

QUANTUM COMMUNICATIONS SYSTEM WITH INTEGRATED PHOTONIC DEVICES

CROSS REFERENCE TO RELATED APPLICATION

This application claims the benefit of U.S. Provisional Patent Application No. 61/684,502, filed Aug. 17, 2012, the disclosure of which is hereby incorporated by reference.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The disclosure pertains to methods and apparatus for transmitting and receiving quantum communications.

BACKGROUND

In quantum communication, two parties exchange information encoded in quantum states. Typically, the quantum states are specially defined properties of photons such as pairs of polarization states (e.g., 0° and 90°, or 45° and 135°) or circular basis states (e.g., left-handedness and right-handedness). Through the quantum communication ("QC"), the two parties produce a shared random series of bits known only to them, which can then be used as secret keys in subsequent encryption and decryption of messages.

A third party can, in theory, eavesdrop on the QC between the two parties. Such eavesdropping perturbs the QC, however, introducing anomalies that the two intended parties can detect. Using conventional communication, the two parties post-process the results of the QC to remove any partial information acquired by an eavesdropper, and form shared secret keys from the remaining information resulting from the QC.

For example, according to one general approach to QC, a transmitter sets the quantum state of binary information, makes a record of how it set the quantum state, and transmits the information. Table 1 shows an example of quantum states and bases for different polarizations of photons. For the bases and states shown in Table 1, the transmitter selects a basis (rectilinear, diagonal, or circular), sets the polarization state for a photon in the selected basis, and records the bit value (0 or 1), the selected sending basis and the time of transmission.

TABLE 1

Example bases and quantum states.

| Basis | 0 | 1 |
|---|---|---|
| Rectilinear (+) | 90° | 0° |
| Diagonal (x) | 45° | 135° (or −45°) |
| Circular | Left | Right |

A receiver receives the binary information, measures the quantum state of the information and makes a record of how it measured the quantum state. The measured state depends on how the receiver performs the measurement (e.g., with measuring basis of rectilinear or diagonal). The transmitter and receiver are expected to record different bit values in some instances because the transmitter and receiver at times set/measure the quantum-state-encoded information in different ways. Thus, after exchanging information in quantum states, the transmitter and receiver compare their records of how the quantum states were set and measured. For this comparison, the transmitter and receiver exchange information over a public channel. Then, the transmitter and receiver produce a shared series of bits (keys) from the encoded information for which quantum states were set and measured in the same way by the transmitter and receiver.

If the rectilinear and diagonal bases and states shown in Table 1 are used, the receiver selects a basis (rectilinear or diagonal), measures the polarization state in the selected basis, and records the measured bit value and measuring basis. No possible measuring basis can distinguish all four states, so the receiver essentially guesses either rectilinear or diagonal. If the measuring basis happens to match the sending basis, the receiver should measure the correct bit value. If the measuring basis does not match the sending basis, however, the measured bit value is as likely to be correct as incorrect. For example, if the sending basis is diagonal for the bit value 0 (polarization state of 45°) but the measuring basis is rectilinear, the measured bit values of 0 (90°) and 1 (0°) are equally likely. The transmitter and receiver compare the sending basis and measuring basis for a given photon, and keep the bit value for a photon if the sending basis and measuring basis match.

If an eavesdropper intercepts and measures a photon, the measurement perturbs the quantum state of the photon. The eavesdropper can only guess the original sending basis when it re-encodes and re-transmits the photon to the intended destination. At the time of measurement by the receiver, the eavesdropping is not detected. Instead, for subsets of the bit values for which sending basis and measuring basis are found to match, the transmitter and receiver compare parity values. The parity values should match exactly, if the system is appropriately tuned and free from imperfections in transmission and reception. Eavesdropping introduces noticeable discrepancies in the bit values, which allows the transmitter and receiver to detect the eavesdropping, correct the keys, and establish an upper limit on the eavesdropper's partial information.

An error-free bit string shared by the transmitter and receiver can then be privacy-amplified (e.g., by hashing with a hashing function) to reduce its length. (Or, bits can simply be dropped, but this lacks advantages of privacy amplification.) The final length of the shared bit string can depend on the number of errors detected. Shortening the shared bit string with privacy amplification reduces knowledge an eavesdropper might have to an arbitrarily low level—typically, much less than a single bit.

Unfortunately, practical QC systems, especially those using optical fibers, exhibit increased errors due to difficulties in establishing appropriate states of polarization (SOPs) at a receiver due to fiber birefringence which can be large and variable. In the presence of fiber birefringence, bit error rates increase, and it may be impossible to identify intended polarization states and bases.

Current QC systems also tend to be expensive and difficult to deploy. For example, single-photon sources are typically bulky and complicated systems requiring cryogenic temperatures or other specially controlled operating environments. However, replacing such sources with more practical systems tends to compromise the security of the QC.

SUMMARY

Quantum communication (QC) transmitters comprise a laser configured to produce an optical flux, a polarization modulator configured to modulate the optical flux so as to encode data in at least two orthogonal polarization bases, a polarization control system configured to transform the modulated optical flux so that the modulated optical flux is delivered to a transmitter output in output polarization bases different than those associated with the polarization modulation, and a variable attenuator configured to apply a variable attenuation to the optical flux so that the data is also encoded in two or more decoy-states, each decoy-state corresponding to a predetermined value for an average photon number. A polarization modulation input can be coupled to the polarization control system and configured to select the transmitter output basis.

In some examples, the two or more decoy-states comprise a vacuum state, a first state corresponding to an average photon number less than 1, and a second state corresponding to an average photon number less than the average photon number of the first state. Polarization bases can be selected from (R, L), (H, V), and (D, A). In some examples, the variable attenuator is a first variable attenuator and the polarization modulation system comprises at least a second variable attenuator configured to generate bright pulses for polarization calibration at a predetermined frequency. The polarization modulator, the variable attenuator, and the laser can be built on a silicon substrate so as to form part of a CMOS circuit.

In some implementations, QC transmitters also comprise a photon detector, a waveguide splitter, and a decoy-state control system. The waveguide splitter is positioned to receive the optical flux downstream from the variable attenuator, and is configured to direct a first portion of the received optical flux to the photon detector according to a predetermined split ratio and to direct a second portion of the received optical flux towards the transmitter output. The decoy-state control system is coupled to the photon detector and to the variable attenuator and configured to control the attenuation applied by the variable attenuator based on the predetermined split ratio and measurements made by the photon detector of the first portion of the optical flux. In some examples, the polarization modulator, the variable attenuator, the laser and the photon detector are integrated on a single chip. The polarization modulator and the variable attenuator can be built on silicon using CMOS processes, or on non-silicon substrates. The laser and the photon detector can be built on non-silicon substrates and dropped into a CMOS circuit, or the laser and photon detector can be built on silicon.

QC receivers comprise a first detector associated with an SOP in a first basis and a second detector associated with an SOP is a second basis conjugate to the first basis. A polarization modulation system is configured to selectively modulate a received optical flux having SOPs in the first and second bases so as to direct corresponding components of the optical flux in each of the first and second SOPs to the corresponding first detector and second detector, respectively, thereby mapping received SOPs into the SOPs of the first and second bases. In typical examples, the polarization bases are selected from (R, L), (H, V), and (D, A). A decoy-state detection system is configured to estimate single-photon transmittance of the optical flux based on photon detector measurements of the optical flux.

The decoy-state detection system can be coupled to the first and the second detectors so as to receive a photon detection signal from each of the detectors. The decoy-state detection system can be configured to generate photon distributions for the flux based on the photon detection signals, where each photon distribution is characterized by an average photon number. The decoy-state detection system can be configured to compare the photon distributions having different respective average photon numbers and to determine a sequence of bits based on the comparison. One of the photon distributions can correspond to a vacuum state and the decoy-state detection system can be configured to estimate background events of the first and the second detector based on the vacuum state photon distribution.

QC methods comprise receiving an optical flux that is polarization encoded according to at least two orthogonal bases and that is associated with at least two decoy-states. States of polarization of the received flux are adjusted so as to produce a state of polarization in each of the orthogonal bases, and the flux is decoded by directing the flux in the produced state of polarization to an associated detector. Photon detection events produced by the flux that are associated with one of the at least two decoy-states are compared with photon detection events produced by the flux that are associated with another of the at least two decoy-states. A single-photon transmittance of the optical flux is estimated based on the comparison. In some examples, the received flux is associated with at least two conjugate orthogonal bases.

In some implementations, QC methods also comprise estimating which of the photon detection events correspond to single-photon signals and selecting a sequence of bits using the single-photon signals. QC methods can comprise generating photon distributions from the photon detection events, wherein the estimating of the single-photon transmittance is based at least in part on the photon distributions.

Methods comprise applying an amplitude modulation to an optical flux based on an input data stream according to two or more predetermined decoy-states to produce a decoy-state optical flux, and applying a polarization modulation to the optical flux based on the input data stream so as to produce a polarization modulated optical flux associated with conjugate states of polarization (SOPs) selected from at least two orthogonal bases, wherein the orthogonal bases are selected to at least partially compensate transmission birefringence. The polarization modulated optical flux can be encoded in phase states of a Mach-Zehnder. The polarization modulated decoy-state optical flux is transmitted to a receiver. The SOPs can be selected so that a received optical flux has states of polarization in one of a rectilinear, diagonal, or circular basis. In typical examples, the transmission birefringence is associated with propagation in an optical fiber.

In some examples, the polarization modulation is associated with SOPs selected from three orthogonal bases that correspond to four equidistant SOPs on a great circle on the Poincaré sphere and two intersections of an axis of the great circle and the Poincaré sphere. In other examples, the polarization modulation is applied by modulating the optical flux in initial bases and then applying a polarization modulation so as to produce the states of polarization in the at least two bases. The applying of the amplitude modulation to the optical flux can be according to three predetermined decoy-states. The decoy-states can comprise a vacuum state, a first state corresponding to an average photon number less than 1, and a second state corresponding to an average photon number less than the average photon number of the first state. The applying of the amplitude modulation can comprise assigning one of the two or more decoy states to each pulse of the optical flux.

Transmitters comprise a laser configured to produce an optical flux comprising multi-photon and single-photon pulses and an amplitude modulator configured to modulate the amplitude of the optical flux so as to associate pulses of the optical flux with an average photon number selected from two or more predetermined decoy-states. A phase or polarization modulator is configured to modulate the optical flux so as to associate the pulses of the optical flux with a state of polarization selected from at least two orthogonal polarization bases. A photon detector and a waveguide splitter are positioned to receive the optical flux downstream from the phase modulator and decoy-state control logic. The splitter is configured to direct a first portion of the received optical flux to the photon detector according to a predetermined split ratio and to direct a second portion of the received optical flux towards a transmitter output. The decoy-state control logic is coupled to the photon detector and to the phase modulator and configured to control the attenuation applied by the amplitude modulator based on the predetermined split ratio and measurements made by the photon detector of the first portion of the optical flux.

The laser, the amplitude modulator, the phase modulator, the photon detector, the waveguide splitter, and the decoy-state control logic can be coupled to one substrate to form a chip-scale transmitter. The phase modulator, the amplitude modulator, and the waveguide splitter can be built on a silicon substrate so as to form part of a CMOS circuit, or on non-silicon substrates. The laser and the photon detector can be built on non-silicon substrates and dropped in to a CMOS circuit, or built on silicon substrates using CMOS processes.

The foregoing and other objects, features, and advantages of the disclosed technology will become more apparent from the following detailed description, which proceeds with reference to the accompanying figures.

DETAILED DESCRIPTION

Figure 1:
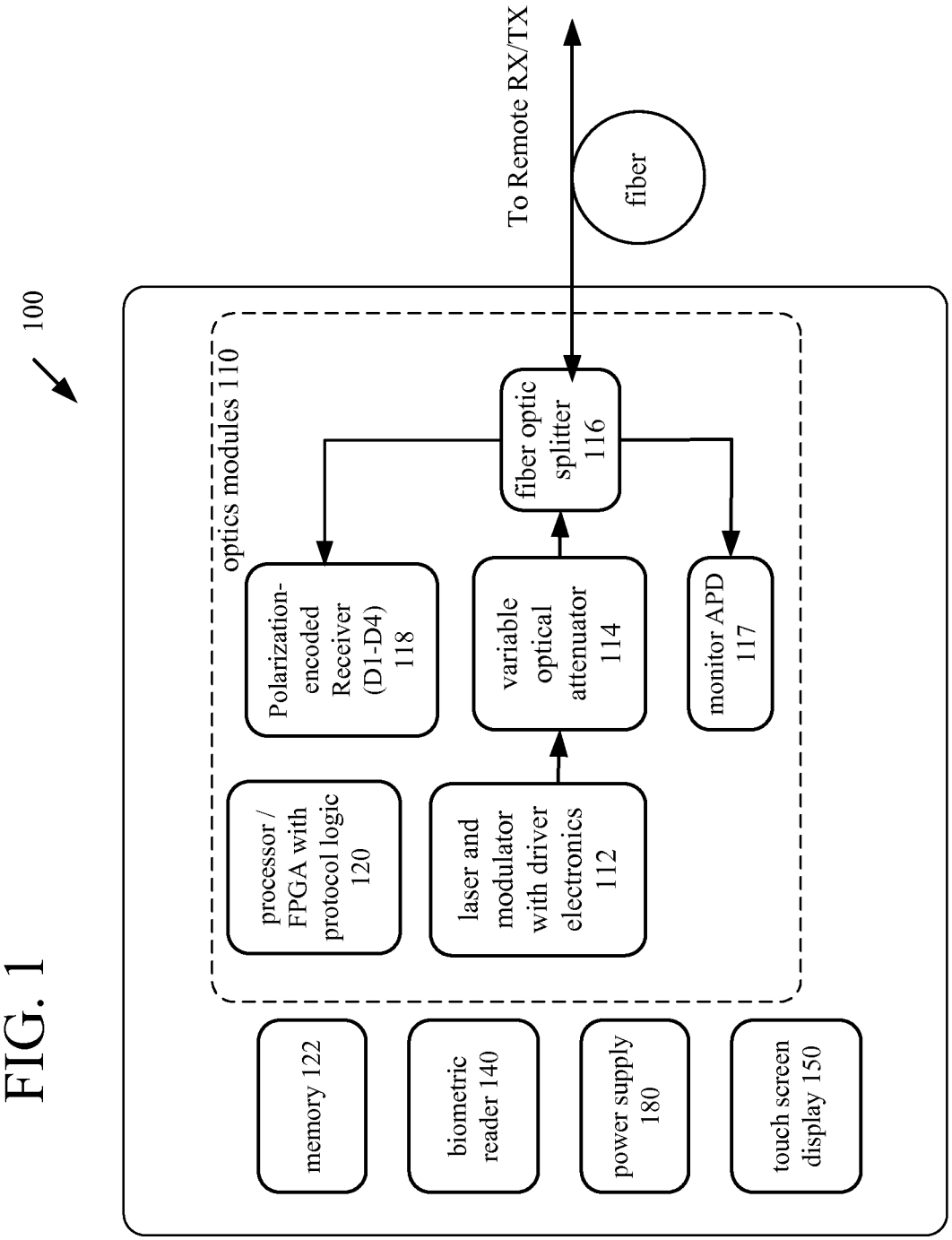
FIG. 1 is a block diagram of a generalized quantum communication (QC) transceiver.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience in the following description, selected linear states of polarization (SOPs) are referred to as rectilinear horizontal, rectilinear vertical, diagonal, and antidiagonal with respect to an xyz coordinate system in which a direction of propagation of an optical beam is along a z-axis. Rectilinear horizontal and vertical SOPs are linear orthogonal polarizations that are along a +x-axis and a +y-axis, respectively. For convenience these can be referred to as "H" and "V" polarizations, respectively. Diagonal polarization ("D") and an anti-diagonal polarization ("A") are orthogonal linear polarizations that are oriented along an axis rotated 45 degrees from the +x-axis towards the +y-axis, and oriented along an axis rotated 45 degrees from the +x-axis towards the −y-axis, respectively. Polarization pairs H, V and D, A form respective polarization bases referred to for convenience as a rectilinear basis and a diagonal basis. The rectilinear basis is an "orthogonal basis," so-called because the polarization states that form the basis—the H and V polarization states—are orthogonal. Likewise, the diagonal basis is an "orthogonal basis," so-called because the polarization states that form the basis—the D and A polarization states—are orthogonal. The rectilinear and diagonal bases are examples of so-called "conjugate bases." In other words, the SOPs forming the rectilinear basis (H, V) are conjugate with the SOPs forming the diagonal basis (D, A). That is, the measurement of an SOP selected from either of the bases randomizes measurement of an SOP selected from the other basis.

It will be apparent that the SOPs and polarization bases described above are representative SOPs and bases only, and other SOPs and bases using other linear polarizations, circular polarizations, or elliptical polarizations can be selected. For example, a circular basis consisting of left and right circular polarizations (L, R) can be used. This circular basis is also an "orthogonal basis" since the L and R polarization states are orthogonal. Any particular coordinate system is selected for convenient description, and other coordinates can be used. In the following description, axes and orientations of waveplates (retardation plates or retarders) or other polarization dependent optical components can be described with respect to this same coordinate system.

SOPs can be conveniently described within a three dimensional coordinate system based on the Poincaré sphere in which linear polarizations are represented by points on a xy-plane, and right-handed circular polarization (RCP) and left-handed circular polarization (LCP) are represented as points situated at a top and bottom (i.e., the poles) of the Poincaré sphere. Other points on the Poincaré sphere represent elliptical polarizations.

As discussed above, QC systems are often based on transmission and detection of polarization modulated optical fluxes having SOPs in two conjugate bases. Such SOPs can be represented on the Poincaré sphere as 4 equidistant points on a great circle. The common basis selections of H, V and D, A corresponds 4 equidistant points in an equatorial plane; the basis selection H, V and R, L corresponds to 4 equidistance points on a vertical plane that includes poles of the Poincaré sphere. Optical fiber often introduces significant time-varying birefringence, so that a received dual basis modulated optical flux from an optical fiber can include SOPs corresponding to four equidistant points on a great circle on the Poincaré sphere, but different from those at the transmitter. The fiber birefringence rotates the great circle associated with the transmitted polarization bases, but the received SOPs remain spaced apart on a great circle having an arbitrary rotation with respect to the polarization bases.

While QC is typically based on four SOPs from two conjugate orthogonal bases, one SOP from each of the bases is sufficient to define a great circle. For example, an H SOP from an H, V basis and an A SOP from an A, D basis are adequate to define a great circle. In decoding, mapping of one received SOP of a first transmitted basis to a first predetermined detector SOP of a first detector basis is associated with mapping of the second orthogonal received SOP to the second SOP of the first detector basis. In addition, the received SOPs associated with a second basis (a conjugate basis) are similarly mapped to the SOPs of the second basis. With any four SOPs equidistant on a great circle on the Poincaré sphere, a single rotation of suitable magnitude about a suitable axis maps all four SOPs to equidistant SOPs on any great circle. For example, orthogonal SOPs in each of two conjugate bases can be mapped to any pair of L, R or H, V, or A, D bases. In some schemes, SOPs from three or more conjugate orthogonal bases can be used, and these bases can be similarly mapped.

Representative QC System Components

As shown in FIG. 1, a representative QC transmitter/receiver includes a plurality of optics modules or optical elements 110 adapted for free space optical communication. The optics modules 110 transmit binary information for which modulation of quantum state is measured (by a QC receiver). The optics modules 110 can also provide a network transceiver adapted to transmit and receive information in a public channel over the optical fiber, transmitting and receiving binary information for which modulation of quantum state is not measured by a QC receiver.

Among the optics modules 110, the laser and modulator with driver electronics 112 include a laser adapted to generate photons for QC transmission and a modulator adapted to modulate quantum state (e.g., polarization state) of output of the laser. The modulator is optically coupled to the laser and can be implemented, for example, with a lithium niobate modulator that modulates polarization state between 0°, 45°, 90° and −45°, typically corresponding to one or more conjugate polarization bases. Alternatively, the modulator is implemented with another kind of integrated-optic or bulk-crystal modulator. The choice of modulator is implementation-specific and can depend, for example, on suitability of the modulator for the specific wavelength of light from the laser, operating frequency of the modulator and/or state purity for the polarization states produced. In some implementations, lasers are provided for each polarization state.

The variable optical attenuator 114 is optically coupled to the laser. The attenuator is adapted to reduce photons per pulse of the laser, which improves security of the QC by foiling eavesdropping attempts that intercept extra photons. The monitor avalanche photodiode ("APD") 117 is split from other modules by the fiber optic splitter 116 and adapted to measure number of photons per pulse from the laser used for QC. For example, the APD 117 is implemented with one or more InGaAs photon detectors. The APD 117 provides feedback used to control the laser and attenuator 114 for QC. Another detector (not shown) receives information as a conventional fiber optic receiver for non-quantum communication.

The processor/field-programmable gate array ("FPGA") with protocol logic 120 controls different operations as part of QC. In particular, the processor/FPGA 120, which is electrically coupled to the module 112, is configured to coordinate operations of the laser and the modulator through driver electronics included with the laser and modulator 112. A random number generator generates a series of random bits for high-quality random numbers. With high-fidelity polarization control, the processor/FPGA 120 controls the polarization of photons with the modulator to encode random bits as different polarization states according to a QC protocol. The processor/FPGA 120 monitors the number of photons per pulse (measured with the APD 117) for the QC. Through control of the laser and variable optical attenuator 114, the processor/FPGA 120 can selectively reduce photons per pulse of the laser to an average level of a single photon per pulse or other predetermined average level (e.g. decoy state).

The processor/FPGA 120 thus controls the timing and pattern of the photon pulses produced by the laser for QC. The processor/FPGA 120 also controls the timing and pulses of higher power pulses (so-called "bright" pulses) produced for synchronization, non-quantum communication and/or other purposes.

For other aspects of the QC protocol, the processor/FPGA 120 controls operations associated with recording the quantum state and sending basis per pulse for the QC, transmitting the recorded sending bases, to, and otherwise processing conventional QC protocol elements. The processor/FPGA 120 can coordinate operations for privacy amplification and decoy states to further improve security. Privacy amplification reduces the length of a shared bit string (e.g., by hashing with a hash function) to reduce partial information that an eavesdropper might have gained.

The final length of the string can be set depending on the number of errors detected. In some examples, the source is a single-photon source. However, imperfect single-photon sources, such as weak laser sources, can also be used. Decoy-states or pulses having different average photon numbers can be transmitted with imperfect sources so that the error rate and number of single-photon pulses in a bit string can be determined and used to regulate the degree of privacy amplification.

The memory 122 stores one or more keys. For example, the memory 122 stores quantum keys. In some implementations, the memory 122 is secure memory and keys are stored in encrypted form. The memory 122 can be fabricated along with the integrated optics modules 110 or separately placed.

The biometric reader 140 is a scanner or other module adapted to accept biometric indicia of a user. For example, the biometric reader 140 is a fingerprint scanner. The processor/FPGA 120 can include logic for encrypting the biometric indicia with a key stored in the secure memory 122. Or, one or more other encryption modules (not shown) can provide such encryption functionality.

The touch screen display 150 accepts user input (e.g., to a numeric keypad) that can be encrypted along with the biometric indicia as part of user authentication. The touch screen display 150 also displays information to the user (e.g., a count of quantum keys in memory 122, a prompt to contact a trusted authority to make quantum keys, a prompt to initiate secure communication with another, or a prompt for another function) and accepts user input.

Outside of the integrated optics modules 110, most of the functional modules can be implemented with standard components for portable or non-portable devices. Among the integrated optics modules 110, many of the modules (e.g., attenuator 114), monitor APD 117, splitter 116 and polarization encoded receiver 118 can be implemented with standard components for fiber optic or bulk optical communication. Other functional modules (e.g., FPGA) can be implemented with control components that have been used with conventional QC transmitters to: (1) produce specific polarization states with a fiber-optic modulator; (2) regulate production of precisely timed QC and bright pulses in a known pattern disciplined with GPS 190 (not shown) or an oscillator or atomic clock, for the trusted authority to track timing and time variations when performing QC; (3) monitor average photon number per pulse using the timing system and APD 117; (4) control APD bias, gating, and discriminator electronics; (5) process conventional QC protocol control elements, e.g., to track, correct and exchange polarization state information. The receiver 118 is configured to deliver bits encoded as a particular state of polarization to a corresponding detector. For QC using two conjugate bases, four detectors D1-D4 are provided, or light is switched between the bases and only two detectors are provided.

Representative Polarization Encoding Transmitters/Receivers

In typical examples, receiver/transmitter units are configured to both send and receive conventional data, but representative receivers and transmitters are described separately below for convenient illustration. In some examples, quantum transmission is one-way, and a quantum transmitter (and no quantum receiver) is configured to transmit to a remote quantum receiver without a quantum transmitter. While bulk optical elements are shown in some examples, fiber-based optics can be used such as fiber optic power splitters and external lenses and bulk components are unnecessary.

Figure 2:
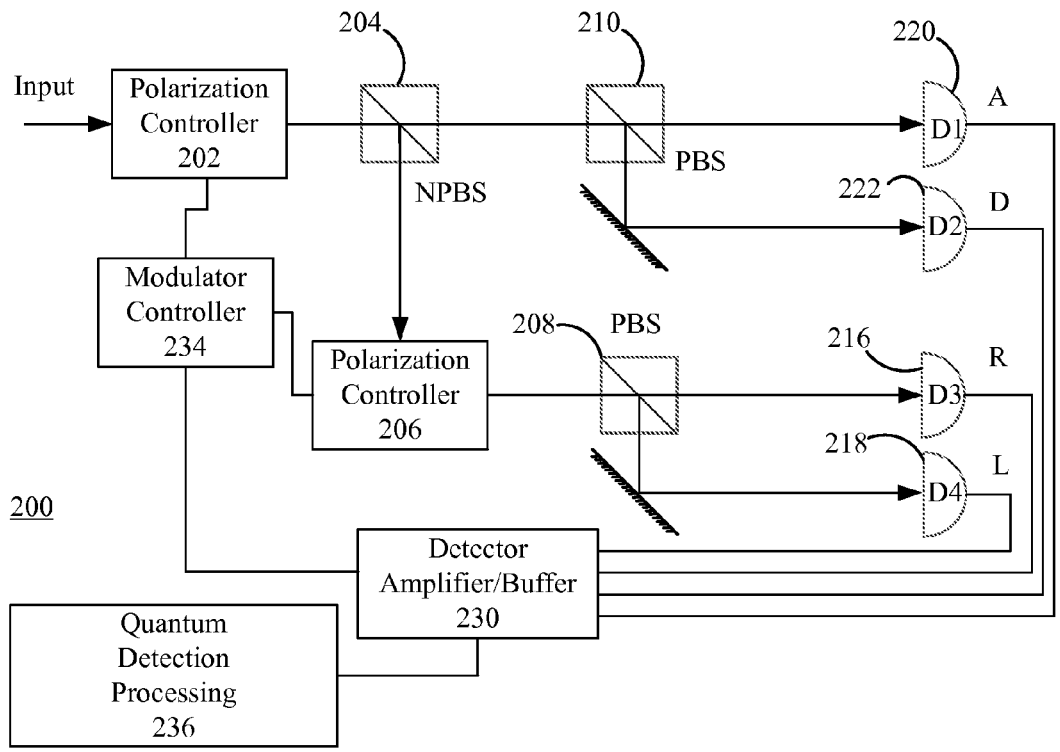
FIG. 2 is a block diagram of an example implementation of a polarization encoded receiver.

A representative polarization encoded receiver 200 that separates polarization states from D, A and R, L bases (or other bases) is illustrated in FIG. 2. A first polarization controller 202 is situated to receive a polarization encoded input optical flux and direct a modulated optical flux to a non-polarizing beam splitter (NPBS) 204. The polarization controller 202 can be implemented as a series of piezoelectric squeezers alternatingly situated at 0 and 45 degrees along a length of optical fiber. Generally at least three or four squeezers are provided, so that variable phase delays along alternating axes can be provided. Such a device can convert any SOP into any other SOP depending on input control voltages. A first portion of the modulated, encoded flux is directed to a second polarization controller 206 and first polarizing beam splitter (PBS) 208. The PBS 208 transmits a component of the optical flux in a linear state of polarization to a detector 216 (D3) and a component in an orthogonal linear SOP to a detector 218 (D4), with the components shown in FIG. 2 corresponding to SOPs R, L, respectively. A second portion of the encoded, modulated flux is directed from the NPBS 204 to a second PBS 210 so that orthogonal linear components of the encoded, modulated flux are directed to detectors 220, 221 (D1, D2), with the components shown in FIG. 2 as A, D SOPs, respectively.

A detector amplifier/buffer is coupled to the detectors D1-D4 and to a modulator controller 234 and a quantum detection processor 236. The modulator controller 234 is configured to establish suitable modulations so that each of the detectors D1-D4 receives a selected polarization state from one of two bases. For example, D1 and D2 are coupled to receive linear (A, D) SOPs, and D3 and D4 are coupled to receive circular (R, L) SOPs. In typical examples, QC detection uses an additional set of four linear detectors, to allow for correction of fiber birefringence, and associated polarization control components, but these are not shown in FIG. 2. Polarization modulators can be waveguide devices, bulk electro-optic modulators, or piezo-electric based polarization controllers. Birefringence changes in optical fibers are slow enough in some cases that high speed polarization modulation is not required, but polarization modulation bandwidth at a receiver tends to be implementation dependent. The receiver of FIG. 2 is based on two predetermined polarization bases.

The receiver 200 of FIG. 2 can be operated as follows, in which QC time periods alternate with calibration periods in which higher power optical fluxes ("bright" fluxes) are used. In one example, the receiver 202 is configured to direct components of an input optical flux in A, D, R, L SOPs (using diagonal and circular bases) to detectors D1, D2, D3, D4, respectively. In response to a "bright" optical flux in a first SOP, for example, an A SOP, the polarization controller 202 is adjusted by the modulator controller to substantially maximize the optical flux received at the detector D1. In response to a "bright" optical flux in a D SOP with the same modulation applied by the polarization controller 202, the optical flux at detector D1 is substantially minimized and the optical flux at detector D2 is substantially maximized. With this adjustment of the modulator 202, the A, D polarization states can be appropriately decoded. In response to a "bright" optical flux in an SOP of the second basis such as an R SOP, the polarization controller 206 is adjusted (with the polarization controller 202 set as described above) so that the optical flux at detector D3 is maximized. With the modulations of at the polarization controllers 202, 206 fixed, each of the detectors D1-D4 receives optical flux portions in predetermined SOPs. It will be appreciated that an A SOP is directed to detector D1 at the same control setting as the D SOP is directed to the detector D2 because the transmitted polarizations remain oppositely situated on a great circle on the Poincaré sphere regardless of any birefringence along the path between the transmitter and receiver. Any rotation on the Poincaré sphere that returns the transmitted A modulation to an A modulation at the detector returns the D modulated optical; flux to the D SOP. Similarly, adjusting a controller so that the transmitted R SOP is directed to a detector D3 necessarily directs the transmitted L SOP to detector D4 as these SOPs are oppositely situated on the Poincaré sphere.

Figure 3:
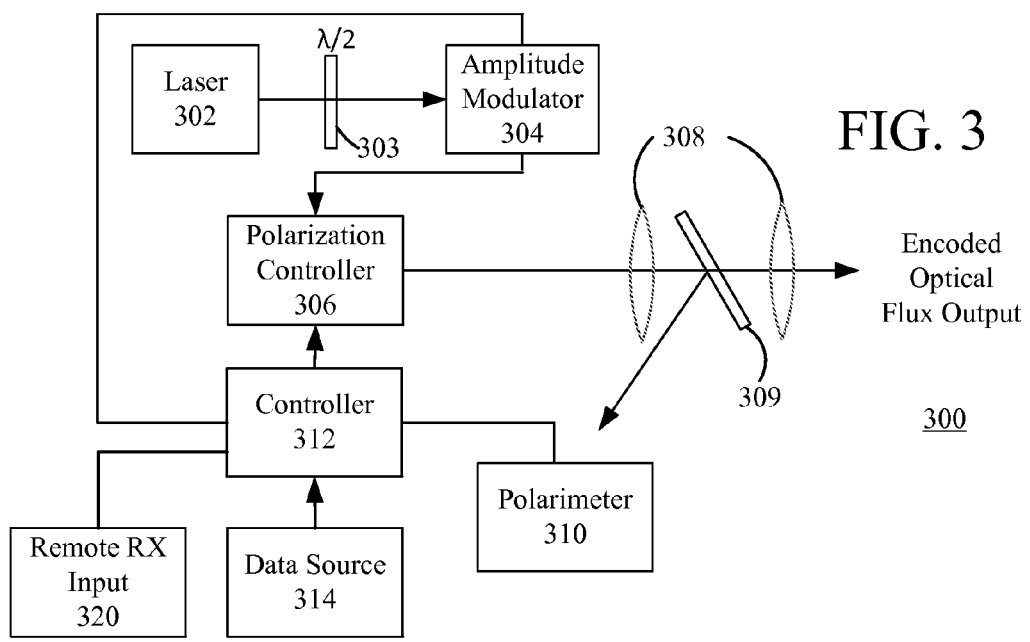
FIG. 3 is a block diagram of a representative polarization encoding transmitter.

With reference to FIG. 3, a polarization encoding transmitter 300 includes a laser 302 that produces an optical flux that is directed to an amplitude modulator 304 and a polarization controller 306 through a half-wave retarder 303. If a full polarization controller is used, this retarder can be omitted. The amplitude modulator 304 is configured so as to control a mean number of photons per bit in QC to be a predetermined number of photons, typically a number between zero and one, by attenuating the laser optical flux. In addition, the amplitude modulator 304 is configured to provide substantially less attenuation in transmission of so-called "bright bursts" for use at a receiver in correcting polarization changes in propagation. Quantum polarization modulation is applied to the optical flux by a polarization controller 306 and the modulated flux is directed to output optics 308 for coupling to an optical fiber or other transmission medium. A portion of the optical flux is directed by a reflector 309 to a polarimeter 310 that is configured to determine one or more SOPs in the optical flux. A controller 312 is coupled to the polarization modular 306, the amplitude modulator 304, and the polarimeter 310 so as to adjust polarization modulation to correspond to the selected bases. In addition, the controller 312 can adjust the amplitude modulator 304, as well as receive and buffer data that is to be transmitted from a data source 314. While the polarization controller 306 can be implemented in various ways, for high speed polarization encoding a waveguide TE/TM convertor such as a LiNBO$_3$ device can be used. The retarder 303 is adjusted to provide approximately equal TE and TM polarizations at the polarization controller 306, and the controller can vary an applied voltage so that the output SOP is varied along a great circle on the Poincaré sphere that passes through the poles. If desired, a polarization modulator can be used that permits mapping any input SOP to any output SOP and the retarder 303 would become unnecessary. Voltages corresponding to A, D, R, L SOPs are used for data modulation. In some cases, an input 320 is provided so that a remote receiver can specify suitable polarization bases for modulation at the transmitter 300 so that the received optical flux is in bases defined at the receiver.

Figure 4:
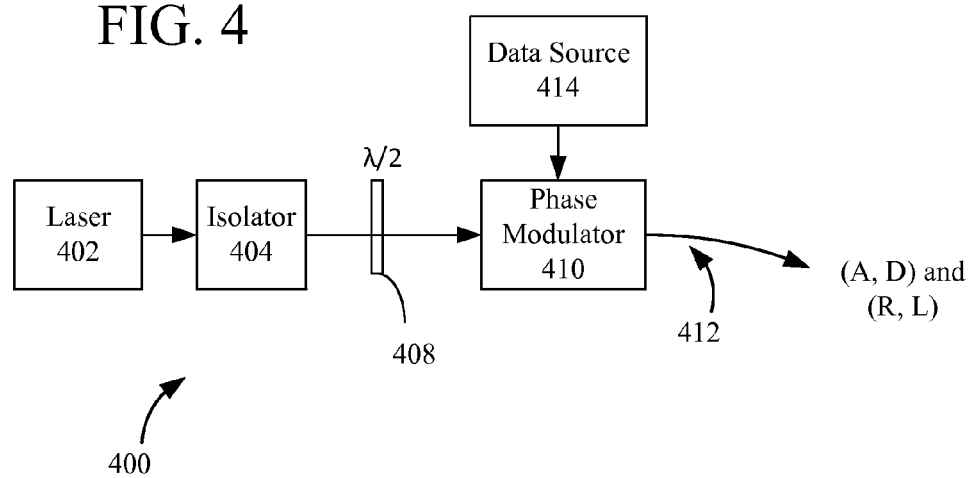
FIG. 4 is a block diagram of an example implementation of a QC transmitter.

Referring to FIG. 4, a fiber coupled transmitter 400 includes a laser 402 that directs an optical flux to an isolator 404 and a half-wave retarder 408. A phase modulator 410 receives the optical flux from the retarder 408 and directs a polarization modulated flux into a fiber 412 based on data from a data source 414. The phase modulator 410 serves as a voltage variable retarder, with a fixed axis and can be provided as an integrated optic waveguide device (e.g., a GaAs device) that produces voltage dependent phase differences on TE and TM polarizations. The phase modulator 410 is configured to modulate an input optical flux so as to provide a polarization encoded output in any of four SOPs of two conjugate bases, an (A,D) basis and an (R, L) basis as shown in FIG. 4. Typically, modulator drive voltages needed to produce the selected SOPs are determined in a calibration procedure in which the modulator drive voltage is varied while the resulting SOP is evaluated with a polarimeter. For a fiber-coupled output, the output SOP of the modulator is measured after some birefringence is introduced by the intervening fiber. The retarder is configured correctly for the system with a single phase modulator when scanning the phase modulator produces a great circle on the Poincaré sphere. Four equally spaced SOPs on the great circle can then be chosen for two conjugate orthogonal bases.

Figure 5:
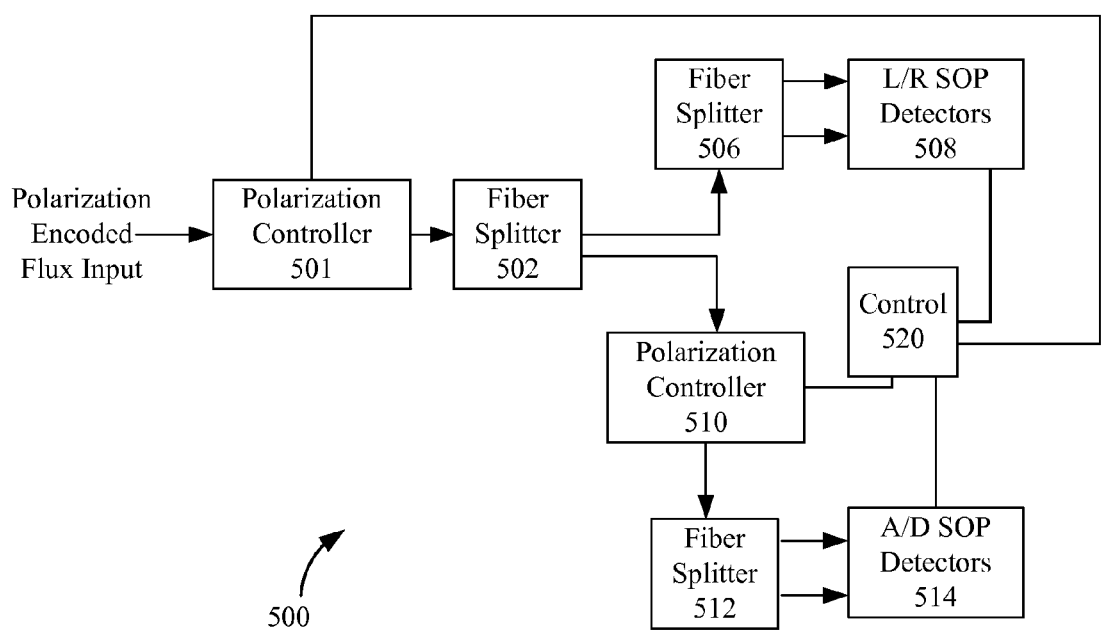
FIG. 5 is a block diagram of an example fiber implementation of a polarization encoded receiver.

With reference to FIG. 5, a polarization receiver 500 includes a first polarization controller 501 such as an integrated optical modulator that is connected to a fiber coupler 502. The fiber coupler 502 is polarization independent and directs a portion of the received optical flux to a polarization dependent fiber coupler 506 that delivers orthogonal polarization components to corresponding L, R SOP detectors in detector module 508. The fiber coupler 502 also directs a portion of the received optical flux to a polarization controller 510 and a polarization dependent fiber coupler 512 that delivers orthogonal polarization components to corresponding D, A SOP detectors in detector module 514. A controller 520 provides suitable drive voltages for the polarization controllers 501, 510. When adjusted appropriately, a L SOP is received at a corresponding L detector, not received at an R detector, and received at ½ amplitude (equally) at A, D detectors. Other SOPs are similarly directed. Generally, a first SOP in a first basis is directed preferentially to a detector associated with the first SOP and the first basis, and not to a detector associated with a second SOP in the first basis. This first SOP of the first basis is directed equally to detectors associated with the second basis.

In the examples above, the receiver includes four detectors (one for each SOP of two conjugate bases), but, in other examples, only one detector for each basis is used. For example, if a modulation is applied so that a linear SOP such as an H SOP is directed to a first detector, a V SOP is generally necessarily directed so as to be available to a second detector that need not be supplied. In addition, while polarization correction can be applied at a receiver as shown above, similar polarization corrections can be provided at a transmitter, or distributed between transmitter and receiver.

Figure 6:
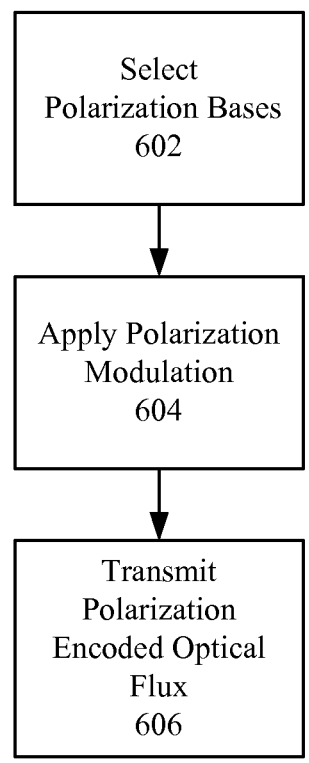
FIG. 6 is a block diagram of a representative transmitter side method.

A representative transmitter side method is illustrated in FIG. 6. At 602, one or more conjugate polarization bases are selected so as to compensate measured or expected birefringence in transmission. At 604, an optical flux is modulated (encoded) with respect to these bases, and at 606, the modulated optical flux is transmitted. In some examples, the bases are selected so that after transmission, the polarization modulated flux is in one or more of a rectilinear basis, a diagonal basis, or a circular basis.

Representative Decoy-State QC Systems

For QC systems lacking a true single-photon source, such as systems using weak laser sources, decoy states can provide added security. Weak laser sources can be advantageous over single-photon sources due to their lower cost and smaller size. However, because weak laser sources produce some multi-photon pulses, QC transmissions can be less secure. These sources emit photons according to a Poisson distribution with an average photon number of μ. Some pulses contained no photons, some pulses contain a single photon, while other pulses contain two or more photons. Sources that emit pulses with more than one photon are susceptible to photon-number-splitting (PNS) attacks when used for QC. During a PNS attack, an eavesdropper intercepts the QC and removes one of the photons from the multi-photon pulses. The eavesdropper stores the removed photon until the intended receiver announces the basis selected for measurement. This information can be transmitted over the public channel when records are exchanged between the transmitter and receiver. The eavesdropper then measures the photon in the same basis and learns the bit value without introducing any errors into the QC. In this manner, the eavesdropper has the potential to gain full knowledge of the series of bits (keys) shared between the receiver and transmitter without being detected.

To reduce risk of PNS attacks and increase security, the rate of multi-photon pulses should be reduced, such as by reducing the mean photon number, $\mu$, for the laser source. However, reducing $\mu$ can increase error rates because the proportion of detector dark counts will likely also increase. Risk of PNS attacks can also be substantially eliminated by using decoy states. By following a decoy-state protocol, a lower bound can be placed on a single-photon transmittance, including receiver losses, and therefore on the number of detections by the receiver that originated from single photons. Consequently, the risk or exposure to PNS attacks can be determined, and the security of the QC is enhanced.

In a decoy-state QC system, a transmitter produces a QC signal that toggles between two or more values for $\mu$. Typically, each bit is randomly assigned a value for $\mu$ by the transmitter, with each $\mu$ value corresponding to a different decoy-state. For example, different probabilities can be assigned to each $\mu$ value, and the probabilities can represent the likelihood of generating a particular decoy-state. The decoy-states are produced by controlled attenuation of the QC signal using an amplitude modulator or variable attenuator. For a given bit signal, an eavesdropper will not know which value of $\mu$ was used to produce the signal, and will therefore treat all single-photon signals the same regardless of the decoy state. Once the QC transmission has ended, the transmitter and receiver can compare the number of detection events for each different $\mu$ transmission and place strict bounds on the single-photon transmittance of the channel. Decoy-states allow parties to estimate the probability that a single-photon pulse is being transmitted, and thus to estimate the security of the QC. The extent to which the single-photon transmittance can be bounded can also depend on acquisition time, or the time spent collecting detection events. That is, a higher rate of secret bit production can be achieved by increasing acquisition time.

In general, a greater number of different $\mu$ values or levels allows for better characterization of channel parameters. Implementations described herein use a three-level decoy-state protocol; however, systems with more or fewer than three levels are also envisioned. In a three-level decoy-state protocol, a transmitter switches between three values for $\mu$: $\mu_0$, $\mu_1$, and $\mu_2$. Typically, $\mu_0$ corresponds to a high value for $\mu$, $\mu_1$ corresponds to a moderate value, and $\mu_2$ corresponds to a low value. In an exemplary three-level decoy-state system, $\mu_2$ is approximately equal to zero and $\mu_1 \ll \mu_0$. In another example, the three values for $\mu$ are approximately 0.5, 0.1 and 0, while in other examples the $\mu$ values are between about 0.25 and about 0.5, between about 0.05 and about 0.1, and between about $1\times10^{-5}$ and about $1\times10^{-2}$. Other values for $\mu$ can also be used and are typically selected based on channel parameters to optimize performance. A decoy state having $\mu$ substantially equal to zero can be referred to as a vacuum state. How close $\mu$ is to zero depends on the amplitude modulator or attenuator used to produce the state. For example, because an amplitude modulator has a finite extinction ratio, a vacuum state generated by an amplitude modulator has a $\mu$ value greater than zero, such as approximately 1.0% of $\mu_0$ or less. Vacuum states can be used to provide an estimate of the background and dark counts detection probability for a particular system.

The probabilities and the values for $\mu$ can be selected by performing simulations to maximize the secret bit rate for various channel parameters. For example, optimal or near-optimal $\mu$ values may depend on the length of transmission, such as on particular link lengths. Additional discussion of $\mu$ value selection can be found, for example, in Rosenberg et al., *Long-Distance Decoy-State Quantum Key Distribution in Optical Fiber*, Phys. Rev. Lett. 98, 010503 (2007), which is hereby incorporated by reference in its entirety.

The receiver in the decoy-state QC system generates photon distributions from the received decoy-state encoded signal using one or more single-photon sensitive detectors. The receiver is able to distinguish, based on the distribution of photon detector events, a $\mu$ value for each decoy state of the received QC. The transmitter and receiver exchange, typically over a public channel, information indicating the $\mu$ value assigned to each bit. Receiver detection events should generate distributions that correspond with the $\mu$ values selected by the transmitter, otherwise an eavesdropper is detected. The transmitter and receiver can then compare detection events for the different $\mu$ values to estimate single-photon transmittance and to determine the portions of bits that came from single-photon and multi-photon pulses.

In an exemplary three-level decoy-state protocol, a vacuum state $\mu_2$ is first used to provide an estimate of the background and dark counts detection probability. Once the receiver is informed by the transmitter which signals corresponded to a vacuum state, the receiver's count of detection events for those signals provides an estimate of the background and dark count detection probability. Confidence levels can also be determined from the estimate. Next, the background and dark count events are subtracted from the detection events for $\mu_1$. This provides an estimate of and confidence levels for the single-photon transmittance since most of the remaining events are single-photon signals. This estimate can then be used to determine the number of $\mu_0$ events that correspond to single-photon signals.

Decoy-state protocols can be used in conjunction with any of the polarization encoding transmitters/receivers described herein.

Representative Decoy-State Transmitters/Receivers

Figure 7:
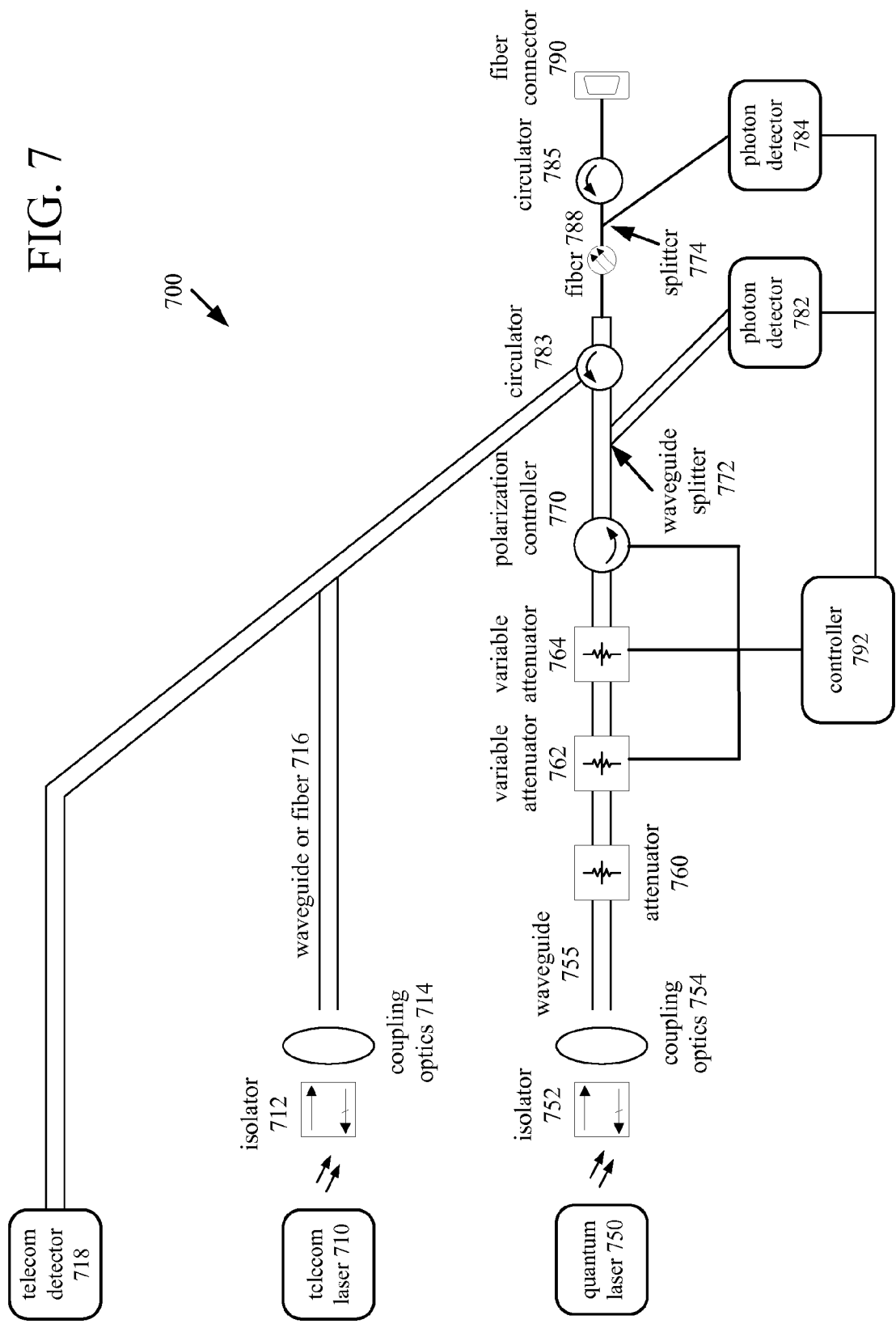
FIG. 7 is a block diagram of an example implementation of a decoy-state transmitter.

An implementation of a decoy-state transmitter 700 is illustrated in FIG. 7. A telecom laser 710 emits photon pulses that are guided through an isolator 712 and coupling optics 714 to a waveguide or fiber 716. The waveguide or fiber 716 conveys the photons to an optical fiber 788 coupled to a fiber connector 790. The fiber connector 790 can be FC-UPC or other connector known in the art. A telecom detector 718 detects photons received through the fiber connector 790 as part of conventional, non-quantum optical communication.

A quantum laser 750 is configured to generate photon pulses for a QC transmission. The photon pulses generated by the laser 750 are guided through an isolator 752 and coupling optics 754 to a waveguide 755. The waveguide 755 includes an attenuator 760 that can be used to effectively disengage the quantum laser 750. The waveguide 755 also includes two variable attenuators or amplitude modulators 762, 764 and a polarization controller or phase modulator 770. One of the variable attenuators 762, 764 is typically a high-speed attenuator used to generate decoy-states, while the other variable attenuator is used for birefringence calibration as discussed above by producing alternate periods of "bright" flux. The high-speed attenuator is fast enough to generate a signal having different $\mu$ values for each pulse or bit, and is configured according to a predetermined decoy-state protocol. The calibration attenuator can be high or low speed, depending on how frequently calibration is performed. For example, calibration can be performed every few seconds or every millisecond. Additional attenuators can also be included along the waveguide 755 in order to obtain a desired level of attenuation. The polarization controller 770 is configured to apply quantum polarization modulation to the received signal as described above.

The waveguide 755 conveys the photon pulses to the optical fiber 788 coupled to the fiber connector 790. The photon pulses are then transmitted by fiber to one or more receivers (not shown). However, in some implementations, the signal generated by the transmitter 700 is transmitted by free-space instead of by fiber-optic cable. At the junction of multiple waveguides, the circulator 783 routes light from one waveguide to another waveguide depending on the direction of light propagation. Light from the fiber connector 790 is routed to the telecom detector 718, and light from the telecom laser 710 or quantum laser 750 is routed towards the fiber connector 790. The circulator 785 similarly routes light from fiber to fiber depending on the direction of light propagation.

A controller 792 with protocol logic controls the variable attenuators 762, 764 to yield the predetermined decoy-state encoded pulses. The protocol logic also controls the polarization controller 770 to modulate the polarization state of the decoy-state pulses and thereby yield polarization encoded pulses. Photon detectors 782, 784 are coupled to the protocol logic control and used for QC feedback purposes. The photon detectors 782, 784 measure portions of the QC optical flux and are used to configure or calibrate the QC system. For example, the photon detector 782 can be configured to determine one or more SOPs of the optical flux, and the protocol logic can use feedback from the photon detector 782 to control the polarization controller 770 so that the desired quantum polarization modulation is performed. Likewise, the photon detector 784 can be configured to determine μ values, and the protocol logic can use feedback from the photon detector 782 to control the high-speed variable attenuator 762 so that the desired decoy-states are produced. Additionally or alternately, the photon detector 782 can be used for system calibration and normalization of the quantum laser 750 to interoperate with the telecom laser 710.

In general, one or both of the photon detectors 782, 784 can be used to evaluate whether pulses from the quantum laser 750 are single-photon pulses or to detect decoy-states. In some implementations, the detectors 782, 784 are single-photon detectors capable of detecting single-photons. For example, the detectors can be APDs, such as InGaAs or InP APDs, operating in Geiger mode. In other examples, the detectors can be transition-edge sensors (TESs), which are sensitive to single-photon detection. The detector can also be a PIN diode that integrates over many pulses.

However, the photon detectors need not be single-photon detectors in order to determine μ values if, for example, a precise, predetermined waveguide split ratio is established. For example, a waveguide splitter 774 can be configured to split the optical flux precisely such that a predetermined number of photons continues to fiber connector 790 and a much greater number of photons continues to the photon detector 784. In one example, the ratio is approximately 10,000 to 1, with approximately 10,000 photons being directed to the photon detector 784 for every one photon being directed to the transmitter output at fiber connector 790. In this manner, the detector 784 need not be single-photon sensitive because μ values can be determined using the signal measured by the detector 784 and the split ratio. In the example with a split ratio of 10,000 to 1, if the detector 784 measured an average photon number of 5000, the μ value for the output signal would be 0.5. Detector 784 is coupled to protocol logic and to one or more of the variable attenuators 762, 764 to control the number of photons in the output signal based on the signal measured by detector 784 and the predetermined waveguide split ratio. The attenuation can be increased if the measured photon signal is larger than desired, or decreased if the signal is smaller than desired. Thus, the average number of photons in the output QC can be determined by the waveguide split and the signal measure by detector 784, without the need for single-photon sensitive detectors. Additionally or alternatively, a splitter 772 can be similarly configured to split the optical flux precisely such that a predetermined number of photons continues to circulator 783 and a much greater number of photons continues to the photon detector 782.

Thermo-electric cooling (TEC) components (not shown) can be used to cool the lasers 710, 750 and photon detectors 782, 784 to an appropriate operating temperature. TEC components or heaters can also provide temperature stabilization for the attenuators and/or polarization controller.

FIG. 7 shows two lasers. Alternatively, the implementation 700 can use a single laser as both the telecom laser 710 and the quantum laser 750. If so, the attenuator 762 facilitates switching between decoy-state pulses for operation as a quantum laser and bright pulses for operation as a telecom laser. Furthermore, for quantum state information being encoded in diagonal basis states and circular basis states, instead of a polarization controller, a phase modulator can be used to change polarization from diagonal to left handedness, or to change polarization from anti-diagonal to right handedness.

In implementations described herein, lasers typically operate at telecom wavelengths (however other wavelengths are possible), and the optical components used in the QC systems are selected to be compatible with the operational wavelength. For example, the quantum laser 750 can operate at an appropriate telecom wavelength (such as 1310 nm or 1550 nm for fiber transmission), and the polarization controller 770 can be a lithium niobate modulator. Alternatively, the quantum laser 750 can operate at another suitable wavelength (such as 780 nm for free-space transmission) and the polarization controller 770 can be a gallium arsenide (GaAs) modulator.

Figure 8:
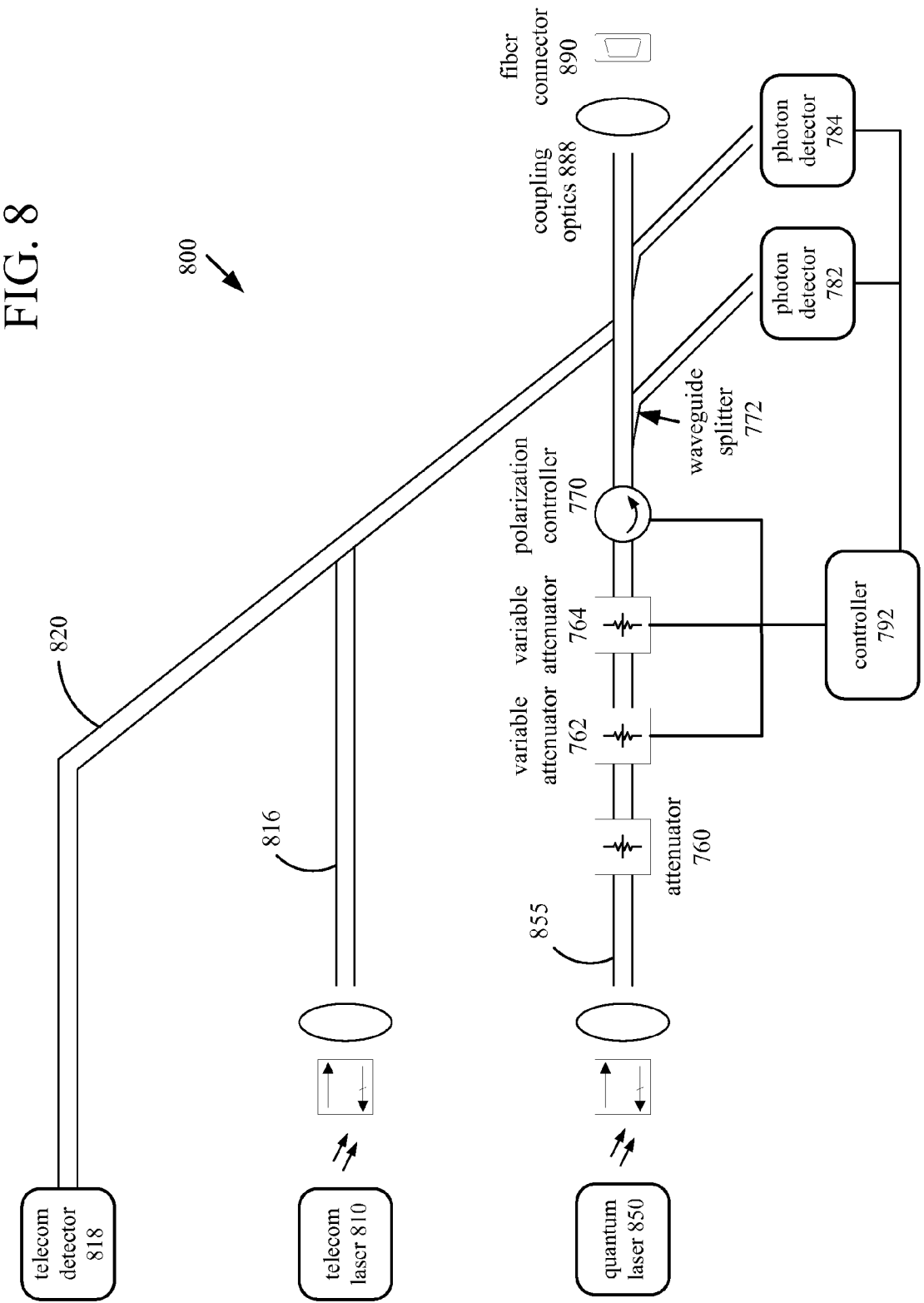
FIG. 8 is a block diagram of another example implementation of a decoy-state transmitter.

FIG. 8 illustrates an implementation similar to that of FIG. 7, but in which other waveguides are used instead of optical fibers. As shown in FIG. 8, a telecom laser 810, a telecom detector 818, and a quantum laser 850 are coupled to waveguides 816, 820, 855, respectively. Coupling optics 888 optically couple the waveguide 855 to a fiber connector 890. Instead of circulators as shown in FIG. 7, the waveguides in the implementation 800 of FIG. 8 are shaped so that light is routed as desired.

Figure 9:
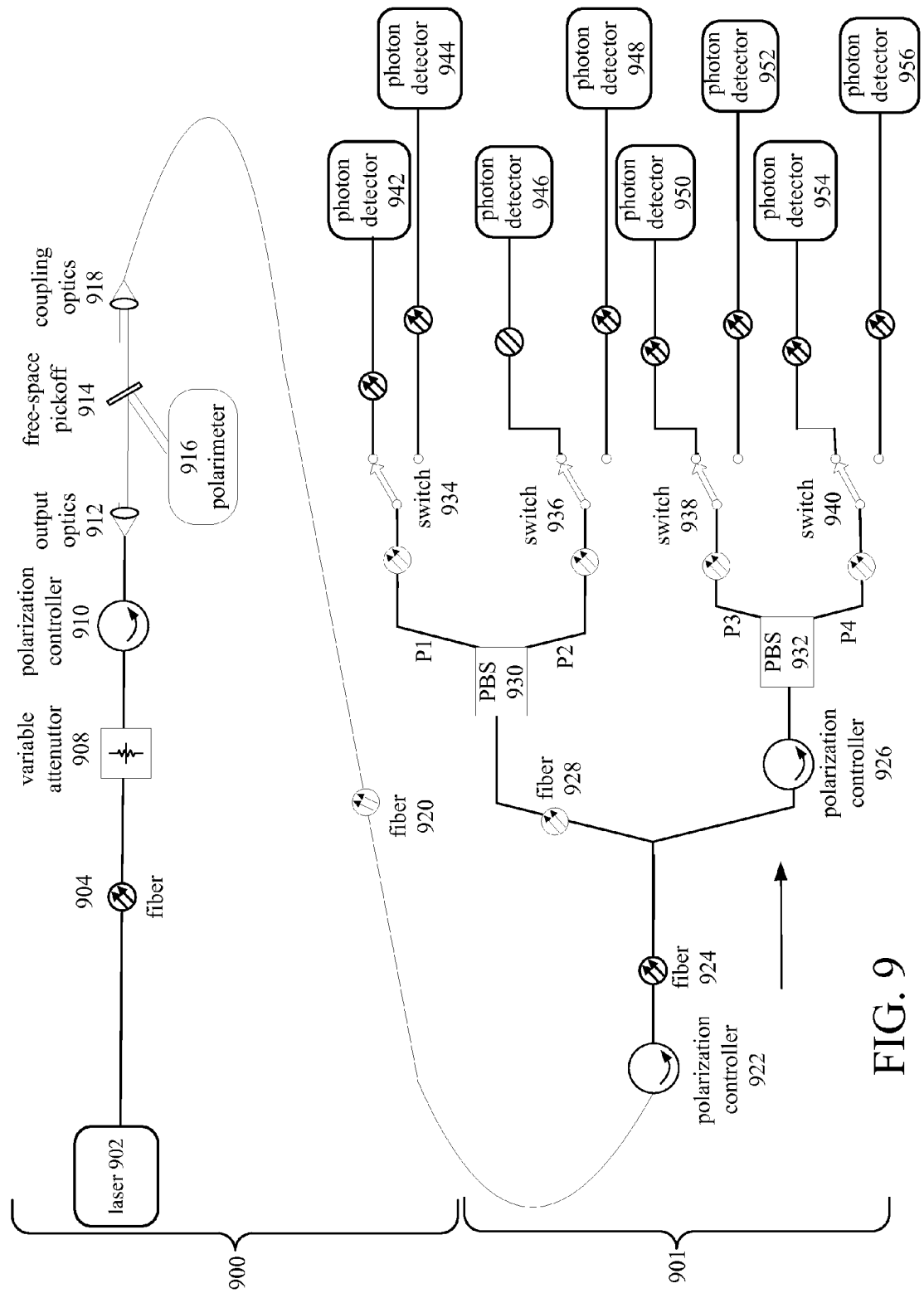
FIG. 9 is a block diagram of an example implementation of a decoy-state system.

An implementation of a decoy-state QC system is shown to FIG. 9. A decoy-state transmitter 900 includes a laser 902 that produces an optical flux that is directed along a fiber 904 to a variable attenuator 908 and a polarization controller or phase modulator 910. The variable attenuator 908 is configured according to a predetermined decoy-state protocol to produce photon pulses having selected μ values, and can be implemented using one or more attenuators. In addition, the variable attenuator 908 is configured to provide substantially less attenuation in transmission of so-called "bright bursts" for use at a receiver in correcting polarization changes in propagation. The polarization controller 910 is configured to apply quantum polarization modulation to the decoy-state encoded optical flux. The polarization modulated flux is directed to output optics 912 and propagates in free space to coupling optics 918 for coupling into fiber 920. A portion of the optical flux is directed by a reflector 914 to a polarimeter 916 that is configured to determine one or more SOPs in the optical flux.

One or more controllers (not shown) are coupled to the polarization controller 910, the variable attenuator 908, and the polarimeter 916 so as to adjust polarization modulation to correspond to the selected bases and so as to adjust the variable attenuator 908 to correspond to the selected decoy-state levels. The transmitter 900 can include one or more photon detectors (not shown) coupled to the controller for calibrating the QC transmission.

Fiber 920 transmits the optical flux from the transmitter 900 to a receiver 901 that is configured to separate polarization states of the received QC. A first polarization controller 922 is situated to receive the polarization encoded optical flux from the transmitter 900 and to direct the optical flux along a fiber 924. The optical flux is then split so that a first portion is directed along a fiber 928 to a polarizing beam splitter (PBS) 930 and a second portion is directed to a polarization controller 926 and to a PBS 932. PBS 930 and PBS 932 each direct orthogonal linear components of the received optical flux along paths P1, P2 and P3, P4 respectively. The polarization controllers 922 and 926 are coupled to a controller (not shown) and configured so that each of the paths P1, P2, P3, P4 is directed to detectors configured to receive selected polarization states from one of two predetermined bases.

Switch 934 directs optical flux along path P1 to detector 944 or to single-photon detector 942. Switch 936 directs optical flux along path P2 to detector 948 or to single-photon detector 946. Switch 938 directs optical flux along path P3 to detector 952 or to single-photon detector 950. Switch 940 directs optical flux along path P4 to detector 956 or to single-photon detector 954. The switches 934, 936, 938, 940 can be implemented using a Mach-Zehnder interferometer, for example. In some examples, the switch is configured to apply extinction ratio changes of about 27 dB or more. This causes a significant change in laser brightness with a quick, single step. More generally, the switches act as variable attenuators.

Single-photon detectors 942, 946, 950, 954 are coupled to a processor (not shown), which includes logic for analyzing photon detection events and/or producing photon distributions based on the events. The processor is configured to estimate the single-photon transmittance and to calculate confidence levels for the transmittance based on measured $\mu$ values. The processor may be additionally configured to calculate $\mu$ values based on photon detection events and to estimate background and dark count detection probability based on vacuum state detection events. The processor can also compare receiver measured $\mu$ values to $\mu$ values from a receiver and determine which bit values came from single-photon pulses in order to select the secret bits from the QC transmission.

Figure 10:
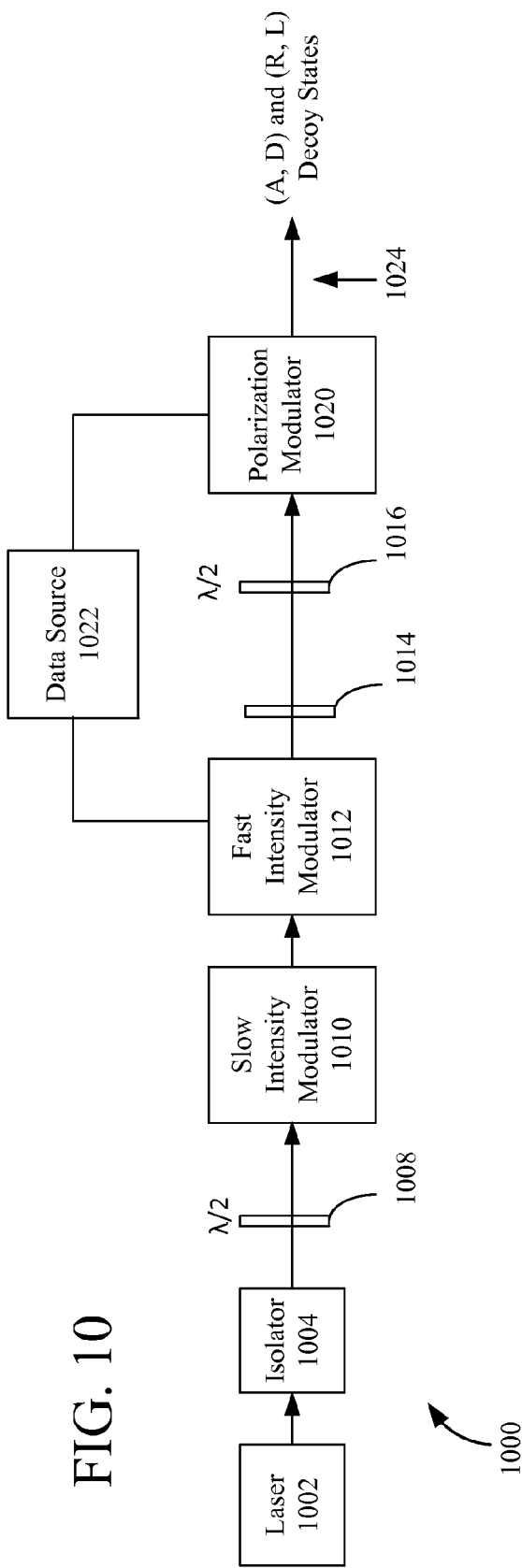
FIG. 10 is a block diagram of an example implementation of a decoy-state transmitter.

An implementation of a decoy-state QC transmitter 1000 is illustrated in FIG. 10. The transmitter 1000 includes a laser 1002 that directs an optical flux to an isolator 1004 and a half-wave retarder 1008. A "slow" intensity modulator 1010 receives the optical flux from the retarder 1008 and is configured to produce optical flux that is intensity modulated about every 1 to 10 ms for calibration purposes. The optical flux is then received by a "fast" intensity modulator 1012, which is configured to modulate the intensity of the received flux about every 1 to 10 ns or faster. Typically, the slow intensity modulator 1010 is configured to attenuate the flux by at least 60 dB or more, while the fast intensity modulator 1012 is configured to attenuate the flux by about 20 dB or more. The fast intensity modulator 1012 is configured to generate decoy-states based on data from a data source 1022.

The modulator 1012 directs a decoy-state modulated flux to a linear polarizer 1014 and a half-wave retarder 1016. A polarization modulator 1020 modulates the polarization of the received decoy-state optical flux based on data from the data source 1022 so as to provide a polarization encoded output in any of four SOPs of two conjugate bases, an (A,D) basis and an (R, L) basis as shown in FIG. 10. Four equally spaced SOPs on a great circle on the Poincaré sphere can be chosen for two conjugate orthogonal bases.

Example Operating Environments for QC Transmitters/Receivers

Figure 11:
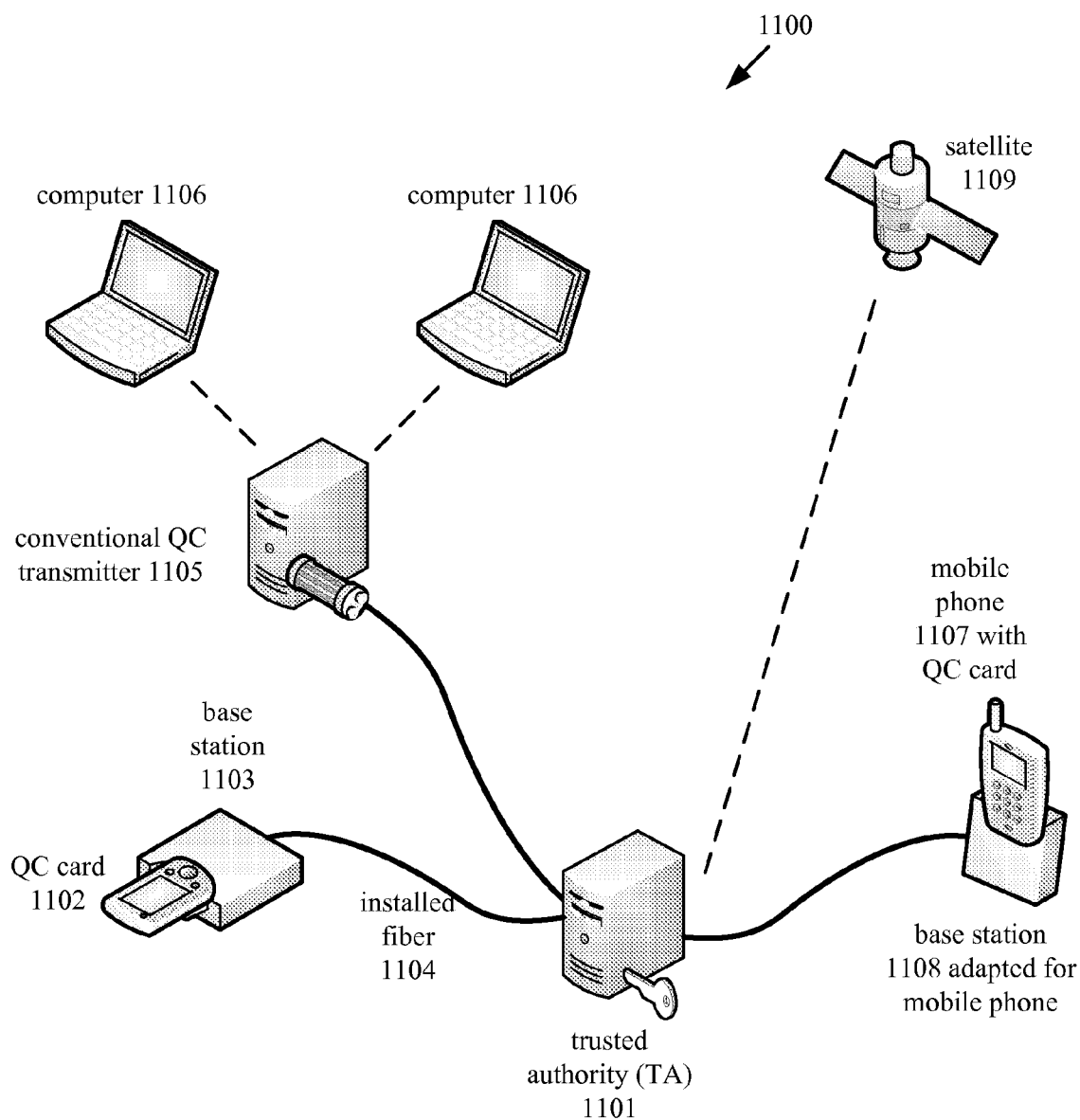
FIGS. 11 and 12 are diagrams of example operating environments in which keys are acquired through QC, disseminated, and used for encryption, authentication and access control.

FIG. 11 shows an example operating environment 1100 in which various user devices acquire keys through QC with a trusted authority 1101. The user devices include a QC card 1102 that couples with a base station 1103, a mobile phone 1107 that has a QC card, a satellite 1109, and several computers 1106 connected to a conventional QC transmitter 1105. A user device generally indicates a computing system associated with a user and can be for an individual user or for a business, financial institution or government institution as user.

The trusted authority 1101 is implemented using a computer system configured to authenticate a user, produce quantum keys in communication with a user device (or conventional QC transmitter 1105), and store the quantum keys. The QC card 1102 couples with a base station 1103, which provides a network connection with the trusted authority 1101 and can provide electric power to the QC card 1102. The QC card 1102 engages in QC with the trusted authority 1101 to produce quantum keys and then stores the quantum keys in secure memory. In general, the QC card 1102 combines advantages of smartcard technology with advantages of quantum key distribution.

In some embodiments, the QC card 1102 includes a QC transmitter. In example implementations, the QC card is made relatively inexpensive and portable by miniaturizing the QC transmitter, or otherwise reducing the transmitter footprint. For example, the QC card can include integrated micro-electro-optical modules capable of producing decoy states and a polarization encoded signal containing pulses having any of four non-orthogonal polarization states. Or, the QC card can be fabricated as a single chip. Compared to conventional QC transmitters, the QC transmitter in the QC card can be a low-power transmitter. Nonetheless, to the extent energy consumption might be a concern, the QC card can draw electric power from the base station at which the QC card is coupled for quantum key distribution. Thus, in some implementations, the QC card is lightweight and robust, and it can be packaged in a mobile phone or other device for which limited size, weight and power consumption are desirable attributes.

To generate quantum keys, a user inserts the QC card 1102 into the base station 1103. Typically, as a pre-condition for quantum key distribution, the trusted authority 1101 authenticates the user. For example, the QC card 1102 transmits authentication information to the trusted authority 1101. The QC card 1102 can be configured to accept a fingerprint scan and personal identification number ("PIN") from the user, encrypt the PIN and fingerprint scan data, and transmit the encrypted material to the trusted authority 1101 for comparison against information previously provided to the trusted authority 1101. Alternatively, the QC card 1102 accepts other biometric information and/or other information that identifies the user.

If the user is authenticated, the QC card 1102 then engages in QC with the trusted authority 1101, and the QC card 1102 and trusted authority 1101 produce cryptographic-quality secret random numbers for quantum keys. The QC card 1102 stores the resulting quantum keys in secure memory on the QC card 1102. The QC card 1102 can later use the quantum keys or distribute the quantum keys to another device for use.

In FIG. 11, the base station 1103 is connected to the trusted authority 1101 over installed fiber 1104. The installed fiber 1104 is used as a quantum channel for point-to-point quantum key distribution between the QC card 1102 and trusted authority 1101, for example, for transmission of a QC signal. In FIG. 11, the installed fiber 1104 is also used as a public channel to exchange non-quantum information between the QC card 1102 and trusted authority 1101, for example, authentication information, non-quantum information about measuring bases, selected/measured decoy states, recording basis in the QC, and/or non-secret key information from the trusted authority 1101. Alternatively, the QC card 1102 and trusted authority 1101 communicate non-quantum information over another type of network media (e.g., copper, RF) or free space (optical), or over a fiber network having another network topology.

The mobile phone 1107 includes a QC card 1102 as well as conventional mobile phone components. The mobile phone 1107 couples with a base station 1108 that is adapted to connect to the mobile phone 1107 and provides a network connection to the trusted authority 1101. The mobile phone's base station 1108 can also provide electric power and a data connection for synchronization of information on the mobile phone 1107. The mobile phone 1107 stores quantum keys produced by the QC card 1102 and trusted authority 1101.

In the examples shown in FIG. 11, the computing system that implements the trusted authority 1101 has a QC receiver. Alternatively, computing system that implements the trusted authority 1101 has a QC transmitter, and the other party to QC includes a QC receiver.

Figure 12:
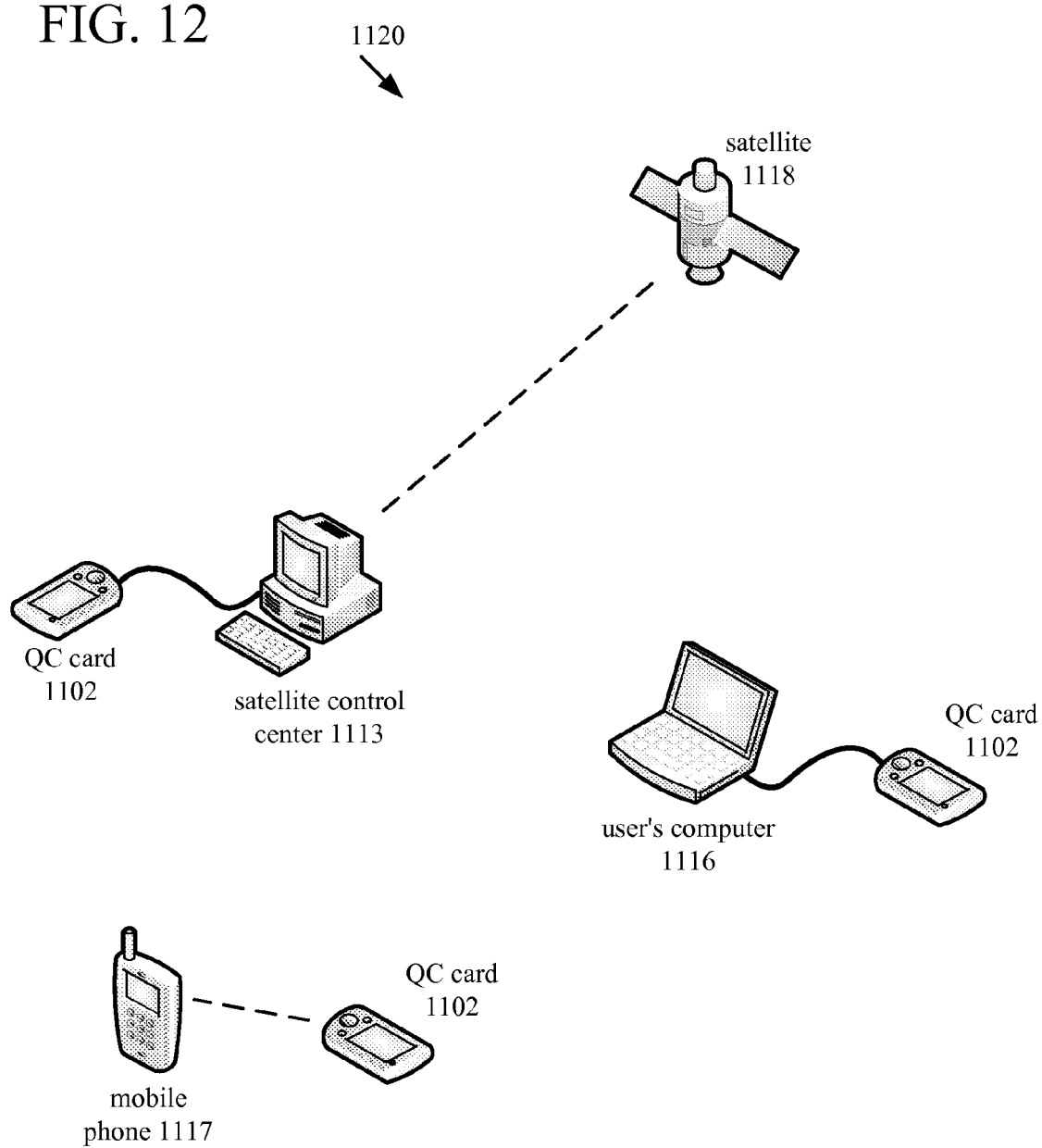

The quantum keys have strong forward security, and FIG. 12 shows an example operating environment 1120 in which a QC card 1102 further distributes quantum keys obtained through quantum key distribution with the trusted authority 1101. A QC card 1102 can distribute stored quantum keys to a mobile phone 1117 or a user's computer 1116. For example, the QC card 1102 transmits the quantum keys over a point-to-point fiber connection or wireless connection. Or, a QC card 1102 provides quantum keys to a satellite control center 1113, which uploads the quantum keys to a satellite 1118.

Once quantum keys are obtained, secure communication is established and a user device can securely communicate with another user device directly or over a public network such as the Internet. Or, the user device can use a quantum key to authenticate itself to another user device or gain access to a facility through an access control device. The quantum keys can be used for secure multi-party communication or authentication according to any available protocol for key management (e.g., symmetric key management) and/or authentication.

QC transmitters/receivers described herein can be implemented with any of the quantum key distribution techniques, including the QC card/trusted authority framework, disclosed in U.S. patent application Ser. No. 12/895,720, entitled "Quantum Key Distribution Using Card, Base Station and Trusted Authority," by Nordholt et al., which is hereby incorporated by reference in its entirety.

Representative Integrated Micro-Optical Implementation

For some QC applications, it can be advantageous to produce exemplary transceivers or receivers described herein as an integrated micro-optical system or module to reduce cost and size. For example, in an operating environment involving quantum key distribution, a QC card is used to obtain quantum keys and to engage in other quantum communications. If the QC card includes a QC transmitter and/or receiver, then the size of these components can place limits on the size of the QC card device. Implementing the transmitter and/or receiver as an integrated micro-optical module may facilitate production of a QC card that is relatively inexpensive, smaller in size and, in some cases, portable. In some examples, integrated micro-optical QC devices are less than about 200 mm in length and less than about 50 mm in width. However, other sizes are possible.

Referring to FIGS. 7 and 8, the illustrated components can be selected to be micro-optical components and integrated to reduce transceiver size and cost. For example, although FIG. 7 shows the quantum laser 750 separate from the polarization controller 770, the quantum laser 750 and polarization controller 770 can instead be more closely integrated, potentially with an amplitude modulator in the same module. Likewise, the polarization controller 770 and one or more of the attenuators 760, 762, 764 can be combined or integrated into a single intensity/polarization modulator. Furthermore, lasers 710 and 750 can be replaced by a single chip laser, and detectors 782 and 784 need not be single-photon detectors where a precise waveguide split is used. All coupling optics, lenses, isolators, and splitters can be implemented using miniature lenses and other micro-optical components.

Other representative transmitters/receivers illustrated or described herein can also be implemented as an integrated micro-optical system by selecting micro-optical components. For example, electro-optic components can be obtained separately and laid out on a rigid substrate such as a silicon micro-optical table. Lenses, waveplates, isolators, and beam splitters can be used to couple the components together. A waveplate or variable retarder can be used as a polarization controller; however, one or more electro-optic modulators can be used instead of or in addition to the waveplate (or variable retarder). Modulators can be coupled together using micro-positioned miniaturized lenses to collimate and focus light from the waveguide of one modulator to the next. Light exiting the device can be either through free-space or on an optical fiber. If the output is free-space, it is generally desirable to provide spatial filtering such as by using an output pinhole to reduce the non-modulated light that enters the output.

Figure 13:
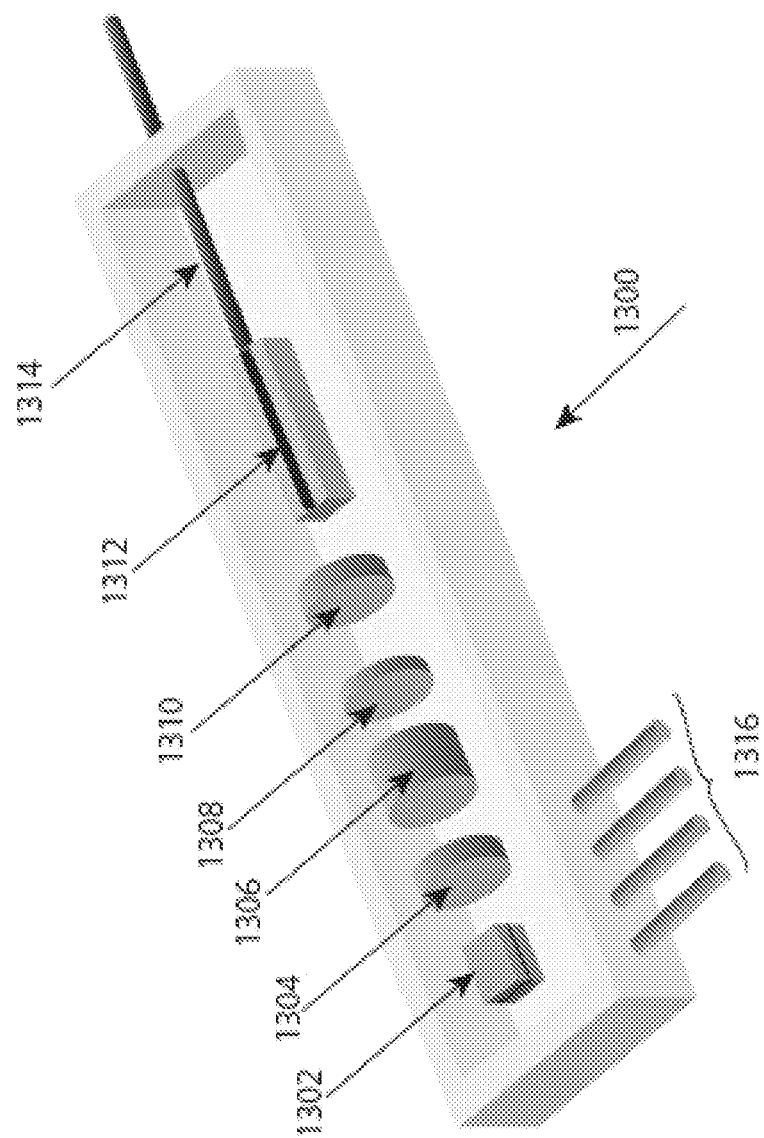
FIG. 13 is an illustration of an example integrated micro-optical QC transmitter module.

An exemplary integrated QC transmitter 1300 is illustrated in FIG. 13. The transmitter 1300 includes multiple chip-scale devices that have been free-space coupled into an integrated module as shown. The transmitter 1300 includes a chip laser 1302 that directs an optical flux to a miniature lens 1304, an isolator 1306 and a half-wave retarder 1308. A lens 1310 couples the flux into a polarization modulator 1312, which serves as a voltage variable retarder, and can be provided as a GaAs polarization modulator chip that produces voltage dependent phase differences between TE and TM polarizations. The polarization modulator 1312 is configured to modulate an input optical flux so as to provide a polarization encoded output in any of four SOPs of two conjugate bases. Four equally spaced SOPs on a great circle on the Poincaré sphere can be chosen for the four SOPs. The polarization modulated flux is then coupled into a fiber 1314.

For example, the fiber 1314 can be an FC-UPC connectorized single-mode fiber. The module 1300 can include additional components, such as thermo-electric coolers or heaters for temperature stabilization of the modulator 1312, the laser 1302, and/or other components. One or more electrical terminals 1316 are provided to supply control or drive signals to the laser 1302, the modulator 1312, and/or other components of the transmitter 1300.

Figure 14:
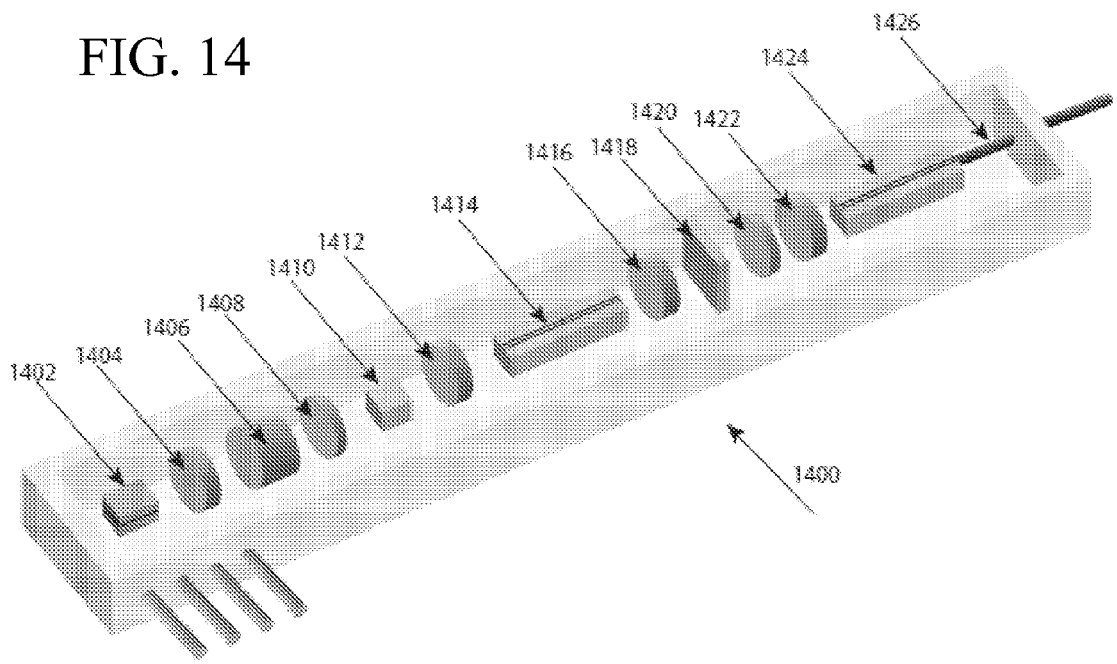
FIGS. 14 and 15 are illustrations of example integrated micro-optical decoy-state transmitter modules.

An exemplary integrated decoy-state QC transmitter 1400 is illustrated in FIG. 14. The transmitter 1400 includes multiple chip-scale devices that have been free-space coupled into an integrated module as shown. The transmitter 1400 includes a laser 1402 that directs an optical flux to a miniature lens 1404, an isolator 1406 and a waveplate 1408. The laser 1402 is a chip laser, such as a DFB or DBR diode laser. The isolator 1406 and the waveplate 1408 are configured to adjust the polarization of received optical flux as appropriate for input into an acousto-optic modulator 1410.

The acousto-optic modulator 1410 receives the optical flux from the waveplate 1408 and is configured to produce optical flux that is intensity modulated about every 1 to 10 ms for calibration purposes. The optical flux is then received by a lens 1412, which directs the optical flux to a Mach-Zehnder intensity modulator 1414. The Mach-Zehnder 1414 is configured to modulate the intensity of the received optical flux about every 1 to 10 ns or faster so as to generate decoy-states according to a predetermined decoy-state protocol. The Mach-Zehnder 1414 directs a decoy-state optical flux to a lens 1416, a linear polarizer 1418, a waveplate 1420, a lens 1422 and a GaAs polarization modulator 1424. The polarization modulator 1424 modulates the polarization of the received optical flux to provide a polarization encoded output in any of four SOPs of two conjugate bases. The output is directed to a lensed fiber 1426. Alternatively, a connectorized fiber can be used.

The module 1400 can include additional components, such as thermo-electric coolers or heaters for temperature stabilization of the modulator 1424, the laser 1402, and/or other components. Also, when implemented, the module 1400 will be connected to power sources and driver electronics not shown.

Figure 15:
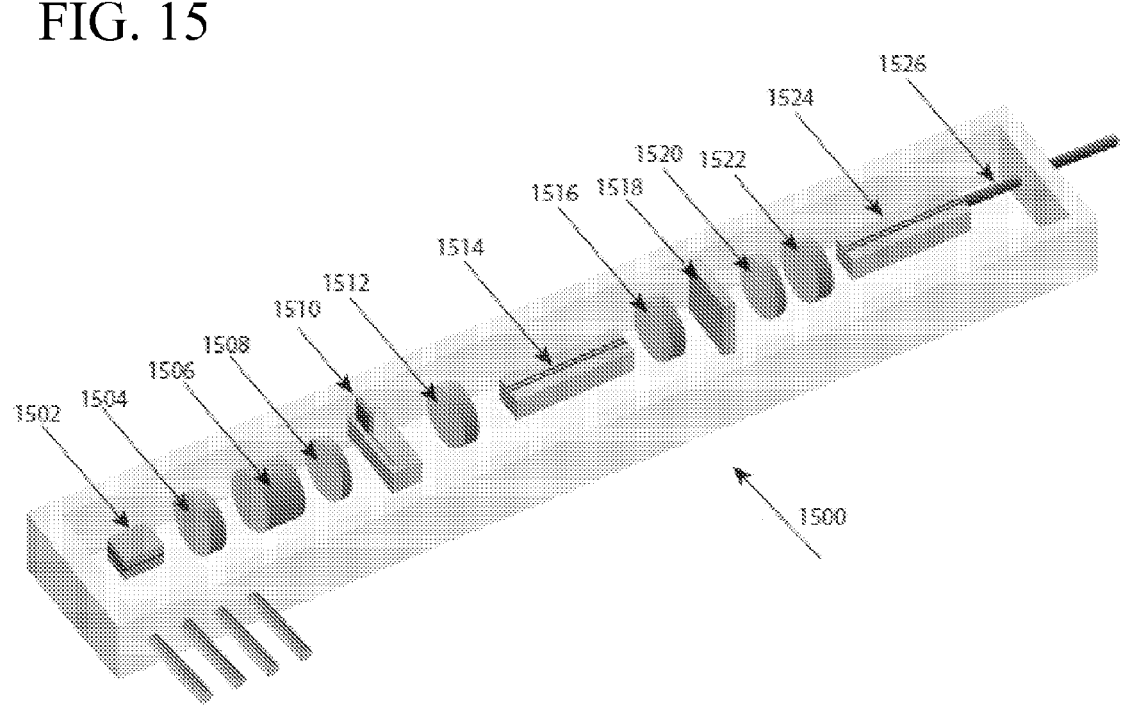

Another exemplary integrated decoy-state QC transmitter 1500 is illustrated in FIG. 15. The transmitter 1500 includes multiple chip-scale devices that have been free-space coupled into an integrated module as shown. The transmitter 1500 includes a laser 1502 that directs an optical flux to a miniature lens 1504, an isolator 1506 and a waveplate 1508. The laser 1502 is a chip laser, such as a DFB or DBR diode laser. The isolator 1506 protects the laser from feedback effects. The waveplate 1508 is configured to rotate the polarization so that the TE and TM fluxes exiting the modulator are substantially equal.

A mechanically actuated attenuator 1510 receives the optical flux from the waveplate 1508 and is configured to produce optical flux that is intensity modulated about every 1 to 10 ms for calibration purposes. The optical flux is then received by a lens 1512, which directs the optical flux to a Mach-Zehnder intensity modulator 1514. The Mach-Zehnder 1514 is configured to modulate the intensity of the received flux about every 1 to 10 ns or faster so as to generate decoy-states according to a predetermined decoy-state protocol. The Mach-Zehnder 1514 directs a decoy-state optical flux to a lens 1516, a linear polarizer 1518, a waveplate 1520, a lens 1522 and a GaAs polarization modulator 1524. The polarization modulator 1524 modulates the polarization of the received optical flux to provide a polarization encoded output in any of four SOPs of two conjugate bases. The output is directed to a lensed fiber 1526.

The module 1500 can include additional components, such as thermo-electric coolers or heaters for temperature stabilization of the modulator 1524, the laser 1502, and/or other components. Also, when implemented, the module 1500 will be connected to power sources and driver electronics not shown.

Whereas conventional QC solutions have tended to be expensive and difficult to deploy, QC components with integrated micro-optical transmitters/receivers can be made at lower cost and having a smaller size.

Representative Chip-Scale Implementation

As stated above with respect to integrated micro-optical modules, reducing the size of a QC transmitter/receiver can be advantageous when implemented in a QC card or other QC user device. Likewise, chip-scale implementations further reduce transmitters/receiver size while reducing complexity, allowing for even smaller system packaging at a reduced cost. For example, chip-scale QC transmitters/receivers can facilitate production of a QC card as part of a handheld or mobile device.

In a chip-scale implementation, optical components of the QC transmitter/receiver are integrated into a single chip, creating an integrated optoelectronic circuit. Components can be monolithically integrated using CMOS-compatible fabrication processes, or the chip can be a hybrid circuit that includes a combination of components fabricated using different materials/substrates not necessarily CMOS-compatible. For example, optical components can be based on silicon photonics and manufactured using CMOS processes. Alternatively, optical components can be fabricated using other techniques, such as on multiple substrates, and then integrated. For example, electronics can be manufactured separately and integrated as a flip-chip onto CMOS chips, or other components such as lasers and detectors can be manufactured separately and then "dropped in" to the CMOS circuit. Preferably, all components of the QC transmitter or receiver are integrated at the chip-level on the same substrate. For example, the lasers, modulators, detectors, etc. are not manufactured separately, but as part of the same chip. Electronics are integrated as well so that separate electronic driver chips or multiple-chip modules are not required.

Lenses typically are not used to couple light between optical components at the chip-scale. Coupling between electro-optical devices can be performed using waveguides on the same or different substrates. Coupling of waveguides on different substrates can be done by dicing the desired substrates across the waveguide and then butting the two waveguides together. It may be desirable to taper one or more of the waveguides where the waveguides are butted together to facilitate mode matching of the light between the two substrates. Furthermore, micro-optics can be introduced into a waveguide where the micro-optical elements cannot be readily made directly on the waveguide substrate. For example, a waveplate may be introduced by cutting a small slot across a waveguide so that the waveplate can be used to change or rotate the polarization state of the light in the waveguide. Light output from the chip-scale implementation can be either on optical fiber or through free-space. Preferably, unwanted or non-modulated optical modes are not emitted.

Figure 16:
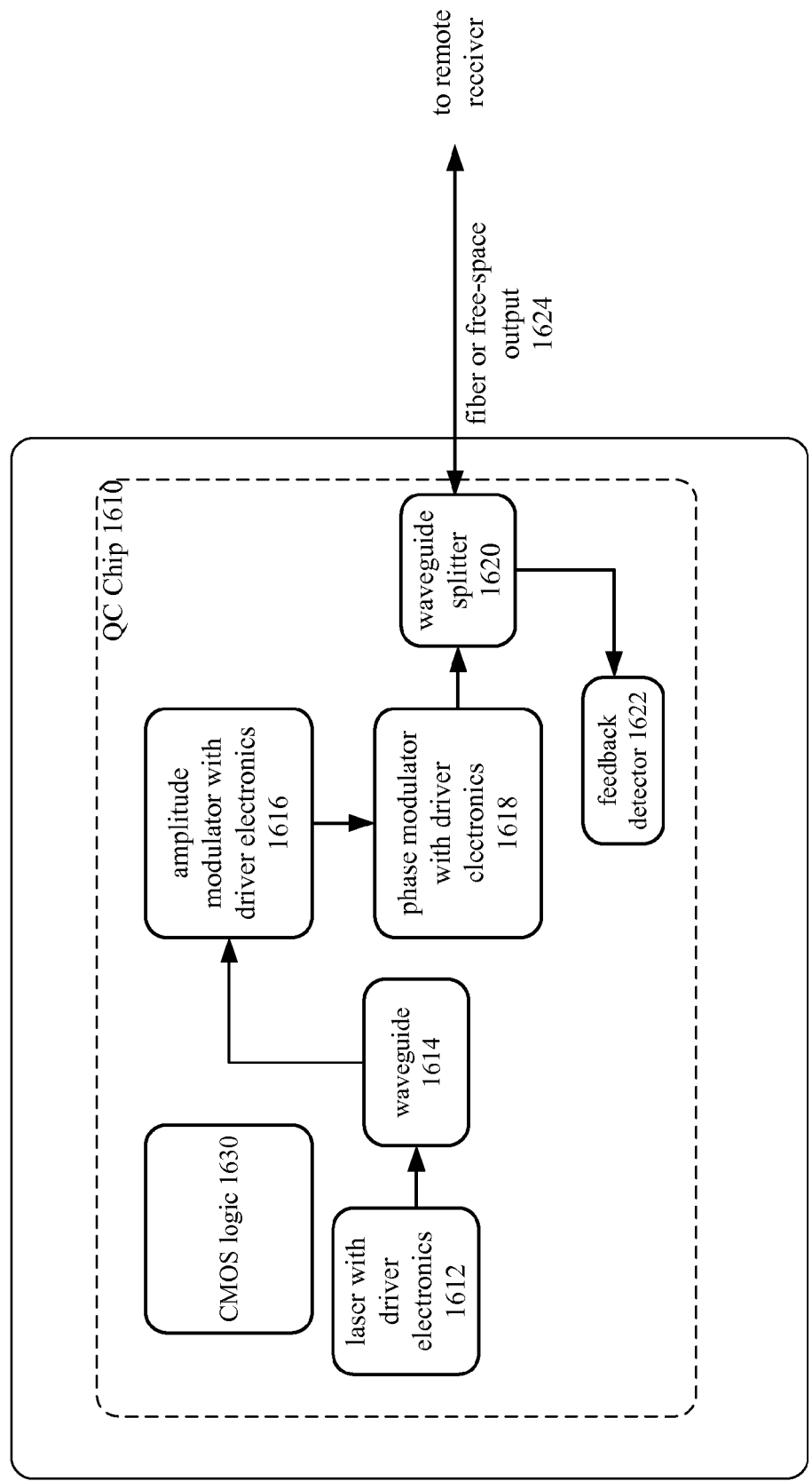
FIG. 16 is a block diagram of an example chip-scale implementation of a decoy-state transmitter.

FIG. 16 is a block diagram of an exemplary chip-scale implementation of a transmitter 1600. The transmitter 1600 includes a chip 1610 containing an integrated optoelectronic circuit configured to generate a QC signal. The transmitter 1600 can also include other components/modules not illustrated in FIG. 16. All of the illustrated components of the QC chip 1610 can be monolithically integrated CMOS components (including silicon photonic components), or the components can form a hybrid circuit, with some CMOS components and other non-CMOS components.

A laser with driver electronics 1612 generates a QC signal that is coupled into a waveguide 1614. The laser can be a CMOS-fabricated laser, such as a silicon laser, coupled to CMOS driver electronics, or the laser can be a "drop-in" non-silicon laser. For example, in a hybrid circuit in which the laser is fabricated separately from other chip components, the laser can be coupled on top of the chip via optical turning mirrors. In some examples, the laser is formed from DFB structures built on the silicon, such as by implanting emitters. Alternatively, the laser can be an off-chip laser fiber-coupled into the chip, such as by using an edge or grating coupler. The laser 1612 is configured to generate quantum transmissions and optionally to also produce telecom transmissions. The waveguide 1614 can be a silicon waveguide or a waveguide formed on a substrate other than silicon. Additional waveguides not shown can also be incorporated into the QC chip 1610 to facilitate coupling of light between optical components.

The QC signal is coupled from the waveguide 1614 to an amplitude modulator with driver electronics 1616 configured to produce predetermined decoy-states and to produce "bright" pulses for calibration of the QC system. The signal is then coupled into a phase modulator with driver electronics 1618 configured to modulate the polarization state of received pulses to produce a polarization encoded QC signal. The amplitude modulator 1616 and the phase modulator 1618 can be separable components connected by a waveguide, or integrated into a single component. Each modulator can be a single modulator or comprise a series of modulators. For example, the amplitude modulator 1616 can be a series of amplitude modulators, joined together in order to achieve the desired attenuation.

In some implementations, modulators are made on the same substrate and joined by waveguides made on that substrate. For example, the modulators can be any silicon optical modulator known in the art, such as those described in the following references: Reed, et al., "Silicon Optical Modulators," *Nature Photonics* 4, 518-526 (2010), and Liow et al., "Silicon Modulators and Germanium Photodetectors on SOI: Monolithic Integration, Compatibility, and Performance Optimization," *IEEE J Quantum Electron.* 16, 307-315 (2010), all of which are incorporated herein by reference. Silicon optical modulators can be monolithically integrated into a CMOS platform with CMOS driver electronics and connected together (and to other silicon photonic components) using silicon waveguides. In other implementations, the modulators are fabricated on different substrates selected to optimize performance of each particular modulator. Non-silicon modulators can be dropped into a CMOS circuit to form an integrated hybrid circuit, and components fabricated on different substrates can be joined together by butting waveguides or by using other techniques.

The modulators are optically coupled to a precise waveguide splitter 1620 configured to direct a portion of the signal to a fiber or free-space output 1624 and a portion of the signal to a feedback detector 1622. The detector 1622 can be a CMOS integrated detector, such as a SiGe or Ge photodetector, or the detector can be a drop-in non-CMOS fabricated detector. For example, in a hybrid circuit in which the detector is fabricated separately from other chip components, light can be coupled via optical turning mirrors into the detector placed on top of the chip. The detector 1620 is configured to measure the polarization state and/or decoy-state of the QC signal. Preferably, the waveguide splitter 1620 is precisely fabricated such that the detector 1620 need not be single-photon sensitive in order to measure μ values, and the output 1624 transmits the desired decoy-state or single-photon pulses to the remote receiver (not shown).

Logic 1630 is fabricated using CMOS processes and contains protocol logic for controlling different operations of the QC chip 1610. The logic 1630 is configured to coordinate operations of the laser 1612 and modulators 1616, 1618 so that the transmitter 1600 produces the desired polarization-modulated decoy-state QC signal. For example, the logic 1630 can include a random number generator or other technology for generating a series of random bits. The logic 1630 can be programmed with a predetermined QC protocol to control the phase modulator 1618 to encode random bits with different polarization states and to control the amplitude modulator 1616 to encode random bits with different decoy-states. The logic 1630 can be electrically coupled to the feedback detector 1622 to facilitate control of the phase modulator 1618 and amplitude modulator 1616. The logic 1630 can also control the timing for generating QC signals, "bright" pulses for calibration, non-quantum communication, and/or other signals.

Figure 17:
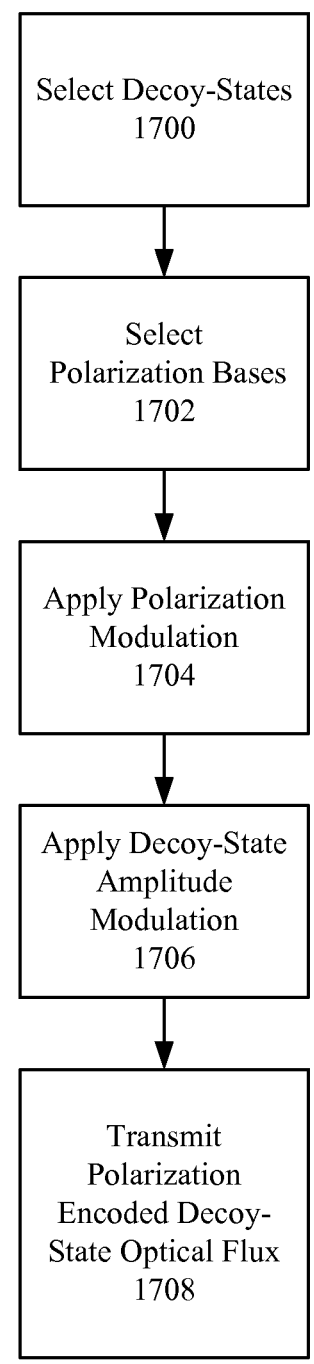
FIG. 17 is a block diagram of a transmitter side method of generating a polarization encoded decoy-state optical flux.

A representative transmitter side method is illustrated in FIG. 17. At 1700, one or more decoy-states are selected to improve security in a system transmitting weak laser pulses. At 1702, one or more conjugate polarization bases are selected so as to compensate measured or unexpected birefringence in transmission. At 1704, optical fluxes are modulated (encoded) with respect to the selected bases, and at 1706, the optical fluxes are amplitude modulated based on the selected decoy-states. At 1708, the polarization encoded decoy-state optical flux is transmitted.

In some examples, the bases are selected so that after transmission, the polarization modulated flux is in one or more of a rectilinear basis, a diagonal basis, or a circular basis. In some examples, optical fluxes are polarization encoded before decoy-state amplitude modulation is applied, while in another examples decoy-state amplitude modulation is applied before polarization modulation. In still another example, polarization modulation and amplitude modulation are applied substantially simultaneously such as by the same component.

In view of the many possible embodiments to which the principles of the disclosed technology may be applied, it should be recognized that the illustrated embodiments are only preferred examples and should not be taken as limiting. We claim as our invention all that comes within the scope and spirit of the appended claims.

We claim:

1. A quantum communication transmitter, comprising:
   a laser configured to produce an optical flux;
   a polarization modulator configured to modulate the optical flux so as to encode data in at least two orthogonal polarization bases;
   a first variable attenuator configured to apply a first variable attenuation to the optical flux so as to enable a receiver to perform birefringence calibration; and
   a second variable attenuator configured to apply a second variable attenuation to the optical flux so that the data is also encoded in two or more decoy-states, each decoy-state corresponding to a predetermined value for an average photon number, wherein the second variable attenuator is configured to operate faster than the first variable attenuator.

2. The transmitter of claim 1, further comprising:
a polarization modulation input coupled to the polarization modulator and configured to select a transmitter output basis.

3. The transmitter of claim 1, wherein the two or more decoy-states comprise a vacuum state, a first state corresponding to an average photon number less than 1, and a second state corresponding to an average photon number less than the average photon number of the first state.

4. The transmitter of claim 1, wherein the polarization modulator, the first variable attenuator, the second variable attenuator, and waveguide splitters are built on a silicon substrate so as to form part of a CMOS circuit.

5. The transmitter of claim 1, wherein the polarization modulator, the first variable attenuator, and the second variable attenuator are built on a silicon substrate so as to form part of a CMOS circuit and the laser is coupled into the CMOS circuit.

6. The transmitter of claim 1, further comprising:
a photon detector;
a waveguide splitter positioned to receive the optical flux downstream from the first variable attenuator and the second variable attenuator, the splitter being configured to direct a first portion of the received optical flux to the photon detector according to a predetermined split ratio and to direct a second portion of the received optical flux towards the transmitter output; and
a decoy-state control system coupled to at least the photon detector and to the second variable attenuator and configured to control the second attenuation applied by the second variable attenuator based on the predetermined split ratio and measurements made by the photon detector of the first portion of the optical flux.

7. The transmitter of claim 6, wherein the polarization modulator, the first variable attenuator, and the second variable attenuator are built on silicon using CMOS processes, and the laser and the photon detector are built on non-silicon substrates.

8. The transmitter of claim 1, wherein the polarization bases are selected from (R, L), (H, V), and (D, A).

9. The transmitter of claim 1, further comprising one or more additional attenuators in series with the first variable attenuator and the second variable attenuator.

10. The transmitter of claim 1, wherein the second variable attenuator is configured to apply the second variable attenuation to the optical flux before the first variable attenuator applies the first variable attenuation to the optical flux.

11. The transmitter of claim 1, wherein the first variable attenuator is configured to apply the first variable attenuation to the optical flux before the second variable attenuator applies the second variable attenuation to the optical flux.

12. A method, comprising:
applying a first amplitude modulation to an optical flux using a first variable attenuator so as to enable a receiver to perform birefringence calibration;
applying a second amplitude modulation to the optical flux using a second variable attenuator based on an input data stream according to two or more predetermined decoy-states, wherein the second variable attenuator operates faster than the first variable attenuator;
applying a polarization modulation to the optical flux based on the input data stream so as to produce a polarization modulated optical flux associated with states of polarization (SOPs) selected from at least two orthogonal bases; and
transmitting the polarization modulated decoy-state optical flux.

13. The method of claim 12, further comprising applying one or more additional amplitude modulations to the optical flux.

14. The method of claim 12, wherein the first amplitude modulation is applied to the optical flux before the second amplitude modulation is applied to the optical flux.

15. The method of claim 12, wherein the second amplitude modulation is applied to the optical flux before the first amplitude modulation is applied to the optical flux.

16. The method of claim 12, wherein the polarization modulation is applied in three orthogonal bases that correspond to four equidistant SOPs on a great circle on the Poincaré sphere and two intersections of an axis of the great circle and the Poincaré sphere.

17. The method of claim 12,
wherein the two or more decoy-states comprise a vacuum state, a first state corresponding to an average photon number less than 1, and a second state corresponding to an average photon number less than the average photon number of the first state; and
wherein the applying of the second amplitude modulation comprises assigning one of the two or more decoy states to each pulse of the optical flux.

* * * * *